US006978245B1

(12) United States Patent  (10) Patent No.: US 6,978,245 B1
Tsuchiya et al.  (45) Date of Patent: Dec. 20, 2005

(54) AUTOMATIC PLANNING APPARATUS AND COMPUTER PRODUCT

(75) Inventors: Eiji Tsuchiya, Tokyo (JP); Rorei Koh, Tokyo (JP); Hiroyuki Machiya, Tokyo (JP); Masanori Honda, Tokyo (JP); Shigeru Kameda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/549,936

(22) Filed: Apr. 14, 2000

(30) Foreign Application Priority Data

Sep. 17, 1999 (JP) ................................ 11-264615

(51) Int. Cl.[7] .............................................. G06F 17/60
(52) U.S. Cl. ........................................................ 705/8
(58) Field of Search ...................................... 705/8–10

(56) References Cited

U.S. PATENT DOCUMENTS

| | | | |
|---|---|---|---|
| 5,233,533 A * | 8/1993 | Edstrom et al. | 700/103 |
| 5,855,006 A * | 12/1998 | Huemoeller et al. | 705/9 |
| 6,223,177 B1 * | 4/2001 | Tatham et al. | 345/751 |
| 6,236,975 B1 * | 5/2001 | Boe et al. | 705/10 |
| 6,442,527 B1 * | 8/2002 | Worthington | 705/8 |

FOREIGN PATENT DOCUMENTS

JP   HEI 11-120237 A   4/1999

OTHER PUBLICATIONS

"Damgaard's New Axpata Version 2.0 Highlights E-commerce, Project and Warehouse Management; COM, OLAP, and Three-Tier Client-Server Also Added". PR Newswire. Jun. 1, 1999.*
Kramer, Matt. "Groupware cuts Overhear for Impromptu Assignments". PC Week. May 29, 1995. vol. 12. Iss. 21. pp. 63-65.*
Dayton, Doug. "New Lotus Agenda 2.0 Stresses Ease of Learning, Productivity". PC Week. Oct. 1, 1990. vol. 7. Iss. 39. p. 10.*
Weddingsoft.com. http://web.archive.org/web/1998.*
Douglass et al. "Understanding Ourselves and Others in the Team." Time Management for Teams. Getting Results, Edition A, pp. 1A-4A, Oct. 1996.*
Grensing. "Don't Delay Start Today: Ten Surefire Ways to Conquer Procrastination." Office Systems, vol. 9, No. 2, pp. 44-45, Feb. 1992.*

* cited by examiner

*Primary Examiner*—Susanna M. Diaz
(74) *Attorney, Agent, or Firm*—Staas & Halsey LLP

(57) ABSTRACT

An automatic planning apparatus comprises a WWW server and an application server which are connected to many clients through the Internet. The clients are operated by the users. The application server creates and asks some questions to the user. The user answers the questions. The answers are analyzed to determine the character. Certain initial conditions are input by the user or some other person. The application server automatically creates a schedule for the preparation of an event desired by the users after taking the input initial conditions and the character of the user into consideration.

11 Claims, 30 Drawing Sheets

FIG.2

DB1 ; MEMBER DATA BASE

| MEMBER ID | PASSWORD | NAME | AGE | SEX | ZIP CODE | ADDRESS | DATE OF BIRTH | PHONE NUMBER |
|---|---|---|---|---|---|---|---|---|
| AAAAA | 1234567 | TARO YAMADA | 20 | MALE | 13201658 | No.6,NAKANO 4-3,NAKANO-KU,TOKYO | 1979.5.6 | 0333654865 |
| BBBBB | az6g3258 | HANAKO SUZUKI | 25 | FEMALE | 35884321 | 3-6-5,SHIRAISHI-KU,SAPPORO, HOKKAIDO | 1974.2.3 | 0135249887 |
| | | | | | | | | |
| YYYYY | dd869sd1c3 | JIRO NIHON | 33 | MALE | 13865435 | No.2,NISHI-SHINJUKU 2-2, SHINJUKU-KU,TOKYO | 1966.8.25 | 0300002222 |
| ZZZZZ | etobaoba | TARO NIHON | 26 | MALE | 35101354 | No.1,KASUMIGASEKI 1-1, CHIYODA-KU,TOKYO | 1973.10.6 | 0300001111 |

FIG.3

DB2 ; MAIN PLAN DATA BASE

| PLAN CODE | CHARACTER PATTERN | MINIMUM PREPARATION PERIOD | POINTER TO PLAN ITEM DATA BASE |
|---|---|---|---|
| 001 | 11111 | 186 | PPA |
| 002 | 11112 | 136 | PPB |
| 003 | 11113 | 125 | PPC |
| 241 | 33331 | 234 | PPX |
| 242 | 33332 | 220 | PPY |
| 243 | 33333 | 199 | PPZ |

FIG.4

DB3 ; MEMBER PLAN DATA BASE

| ITEM CODE | DATE | CHECK | BUDGET | BUDGET RATIO (%) |
|---|---|---|---|---|
| 010132 | 1999.8.15 | NO | ¥0.00 | 0.00% |
| 010135 | 1999.8.17 | NO | ¥0.00 | 0.00% |
| 010168 | 1999.8.20 | NO | ¥0.00 | 0.00% |
| 010362 | 1999.12.25 | NO | ¥80,000.00 | 9.00% |
| 010631 | 2000.1.18 | NO | ¥0.00 | 0.00% |
| 010594 | 2000.1.22 | NO | ¥500,000.00 | 32.00% |

FIG.5

DB4 ; MEMBER-ONLY CALENDAR DATA BASE

| DATE | ATTRIBUTE |
|---|---|
| 1999.8.15 | HOLIDAY |
| 1999.8.16 | WEEK DAY |
| 1999.8.17 | WEEK DAY |
| 2000.6.5 | WEEK DAY |
| 2000.6.6 | HOLIDAY |
| 2000.6.7 | HOLIDAY |

FIG.6

DB5 : QUESTIONNAIRE DATA BASE

| ID | ITEM | FILE TYPE | FILE NAME | CHOICE A | CHOICE B | CHOICE C | CHOICE D | CHOICE E |
|---|---|---|---|---|---|---|---|---|
| 1 | DO YOU EVER GIVE YOUR OPINION INTERRUPTING THE SPEECH OF THE OTHER PERSON? | STILL IMAGE | q0001 | YES | NO | NULL | NULL | NULL |
| 2 | ARE YOU CONSIDERATE OF OTHERS? | STILL IMAGE | q0002 | YES | NO | NULL | NULL | NULL |
| 3 | WHAT WILL YOU DO? | ANIMATION | q0003 | HELP | HIDE YOURSELF | WATCH | CRY | LAUGH |
| 123 | WHAT DO YOU THINK HAS CAUSED THIS? | ANIMATION | q0123 | ...... | ...... | ...... | ...... | ...... |
| 124 | WHAT DO YOU IMAGINE? | VOICE | q0124 | ...... | ...... | ...... | ...... | ...... |
| 125 | ARE YOUR A CALCULATING MAN? | STILL IMAGE | q0125 | ...... | ...... | ...... | ...... | ...... |

FIG.7

DB6 : HALL DATA BASE

| ID | HALL NAME | ZIP CODE | ADDRESS | PHONE NUMBER | FORM | JAPANESE STYLE | CHRISTIAN STYLE | SOCIAL GATHERING TYPE | MINIMUM NUMBER OF ATTENDANTS | MAXIMUM NUMBER OF ATTENDANTS | PERFORMANCE FACILITIES | |
|---|---|---|---|---|---|---|---|---|---|---|---|---|
| 1 | A HALL | 1000005 | CHIYODA-KU, TOKYO XXXXXXX | 332XXXXXX | SPECIALTY HALL | True | False | False | 50 | 120 | ..... | ..... |
| 2 | B HALL | 1440041 | OHTA-KU, TOKYO XXXXXX | 357XXXXXX | SPECIALTY HALL | True | True | True | 30 | 130 | ..... | ..... |
| 3 | C CENTER | 1500002 | SHIBUYA-KU, TOKYO XXXXX | 334XXXXXX | SPECIALTY HALL | True | True | True | 20 | 300 | ..... | ..... |
| 2016 | X HOTEL | 1020072 | CHIYODA-KU, TOKYO XXX | 332XXXXXX | HOTEL | True | True | False | 30 | 500 | ..... | ..... |
| 2017 | Y HOTEL | 1020082 | CHIYODA-KU, TOKYO XXX | 120XXXXXX | HOTEL | True | True | True | 30 | 250 | ..... | ..... |
| 2018 | Z HOTEL | 1008550 | CHIYODA-KU, TOKYO XXX | 335XXXXXX | HOTEL | True | True | True | 20 | 600 | ..... | ..... |

FIG.8

DB7 ; HALL CHARGE DATA BASE
(COMMODITY NO.1000005)

| ITEM | MINIMUM PRICE | MAXIMUM PRICE |
|---|---|---|
| JAPANESE STYLE | ¥20,000 | ¥60,000 |
| CHRISTIAN STYLE | ¥20,000 | ¥75,000 |
| SOCIAL GATHERING TYPE | ¥30,000 | ¥80,000 |
| EATABLE | ¥18,000 | ¥55,000 |
| VIDEO TAPE | ¥25,000 | ¥50,000 |
| CAKE | ¥30,000 | ¥60,000 |

FIG.9

DB8 ; HALL RESERVATION SITUATION DATA BASE

| DATE | RESERVATION | NAME OF RESERVER | ADDRESS | PHONE NUMBER | ⋯ | ⋯ | ⋯ | ⋯ |
|---|---|---|---|---|---|---|---|---|
| 1999.8.1 | RESERVED | TARO YAMADA | NO.1 MARUNOUCHI 1-9,CHIYODA-KU, TOKYO | 111111111 | ⋯ | ⋯ | ⋯ | ⋯ |
| 1999.8.2 | NOT RESERVED | | | | | | | ⋯ |
| 1999.8.3 | NOT RESERVED | | | | | | | ⋯ |
| 2010.12.29 | RESERVED | JIRO SUZUKI | NO.1 IIDABASHI 1-1, CHIYODA-KU, TOKYO | 222222222 | ⋯ | ⋯ | ⋯ | ⋯ |
| 2010.12.30 | NOT RESERVED | | | | | | | ⋯ |
| 2010.12.31 | NOT RESERVED | | | | | | | ⋯ |

FIG.10

DB9 ; COMMODITY DATA BASE

| I D | COMMODITY NAME | COMMODITY NO. | LINK TO MAGAZINE PAGE | PHONE NUMBER |
|---|---|---|---|---|
| 1 | A HALL | 1000005 | http://www.xxx.co.jp/0001/0001.html | 332XXXXXX |
| 2 | B HALL | 1440041 | http://www.xxx.co.jp/0001/0008.html | 357XXXXXX |
| 3 | C CENTER | 1500002 | http://www.xxx.co.jp/0001/0012.html | 334XXXXXX |
| 2016 | X HOTEL | 1020072 | http://www.xxx.co.jp/1352/1234.html | 332XXXXXX |
| 2017 | Y HOTEL | 1020082 | http://www.xxx.co.jp/1353/0001.html | 120XXXXXX |
| 2018 | Z HOTEL | 1008550 | http://www.xxx.co.jp/1354/0001.html | 335XXXXXX |

FIG.11

DB10 ; PLAN ITEM DATA BASE

| ID | CODE | ATTRIBUTE | LEVEL | CLASS | DESIGNATION | MAX NUMBER OF DAYS FOR PREPARATION | COST RATIO (%) | DETAILED INFORMATION LINK ADDRESS |
|---|---|---|---|---|---|---|---|---|
| 1 | 000132 | DISCUSS ABOUT STYLE, SIZE AND BUDGET OF WEDDING CEREMONY AND PARTY | 1 | | NOT DESIGNATED | 999999 | 0.00% | http://www.xxx.co.jp/life/abc/def.html |
| 2 | 000135 | DETERMINE DESIRED HALL CANDIDATES BY REFERRING TO CATALOGS AND LITERATURE | 2 | 1 | NOT DESIGNATED | 999999 | 0.00% | http://www.xxx.co.jp/life/ghi/jkl.html |
| 3 | 000168 | MAKE PRELIMINARY INSPECTION OF THE CANDIDATE HALLS THUS DETERMINED | 1 | | HOLIDAY | 999999 | 0.00% | http://www.xxx.co.jp/life/bridal/001.html |
| 123 | 010362 | PREPARE SEATING LAYOUT | 2 | 124 | NOT DESIGNATED | 120 | 9.00% | http://www.xxx.co.jp/life/bridal/bbb.html |
| 124 | 000631 | FINAL MEETING WITH HALL | 1 | | HOLIDAY | 21 | 0.00% | http://www.xxx.co.jp/life/mno.html |
| 125 | 036594 | DAY OF WEDDING CEREMONY | 1 | | HOLIDAY | 0 | 32.00% | http://www.xxx.co.jp/life/abc/pqr.html |

FIG.12A

DB11 ; WEIGHT DATA BASE

| ID | θ1 | θ2 | θ3 | ...... | w11 | w12 | w13 | w14 | w15 | w16 | w17 | w21 | ...... | ...... |
|---|---|---|---|---|---|---|---|---|---|---|---|---|---|---|
| 1 | 15.2 | 13.5 | 14.5 | ...... | 1.20 | 0.95 | 0.45 | 1.11 | 0.77 | 0.54 | 0.28 | 1.10 | ...... | ...... |
| 2 | 11.8 | 21.3 | 11.2 | ...... | 0.88 | 0.35 | 0.44 | 0.94 | 0.36 | 0.35 | 0.26 | 0.11 | ...... | ...... |
| 3 | 34.2 | 8.3 | 11.9 | ...... | 0.36 | 0.64 | 0.33 | 0.54 | 0.10 | 0.49 | 0.27 | 0.98 | ...... | ...... |
| 123 | ...... | ...... | ...... | ...... | ...... | ...... | ...... | ...... | ...... | ...... | ...... | ...... | ...... | ...... |
| 124 | ...... | ...... | ...... | ...... | ...... | ...... | ...... | ...... | ...... | ...... | ...... | ...... | ...... | ...... |
| 125 | ...... | ...... | ...... | ...... | ...... | ...... | ...... | ...... | ...... | ...... | ...... | ...... | ...... | ...... |

FIG.12B

DB12 ; WEIGHT DATA BASE

| ID | θ1 | θ2 | θ3 | ...... | W11 | W12 | W13 | W14 | W15 | W21 | W22 | W23 | ...... | ...... |
|---|---|---|---|---|---|---|---|---|---|---|---|---|---|---|
| 1 | 38.2 | 13.5 | 14.5 | ...... | 0.4 | 0.5 | 0.4 | 0.98 | 0.64 | 0.65 | 0.28 | 0.44 | ...... | ...... |
| 2 | 16.3 | 21.3 | 11.2 | ...... | 0.8 | 0.6 | 0.14 | 0.56 | 1.32 | 0.34 | 0.26 | 0.89 | ...... | ...... |
| 3 | 2.8 | 8.3 | 11.9 | ...... | 0.8 | 0.25 | 0.3 | 0.34 | 0.98 | 0.31 | 0.27 | 0.85 | ...... | ...... |
| 123 | ...... | ...... | ...... | ...... | ...... | ...... | ...... | ...... | ...... | ...... | ...... | ...... | ...... | ...... |
| 124 | ...... | ...... | ...... | ...... | ...... | ...... | ...... | ...... | ...... | ...... | ...... | ...... | ...... | ...... |
| 125 | ...... | ...... | ...... | ...... | ...... | ...... | ...... | ...... | ...... | ...... | ...... | ...... | ...... | ...... |

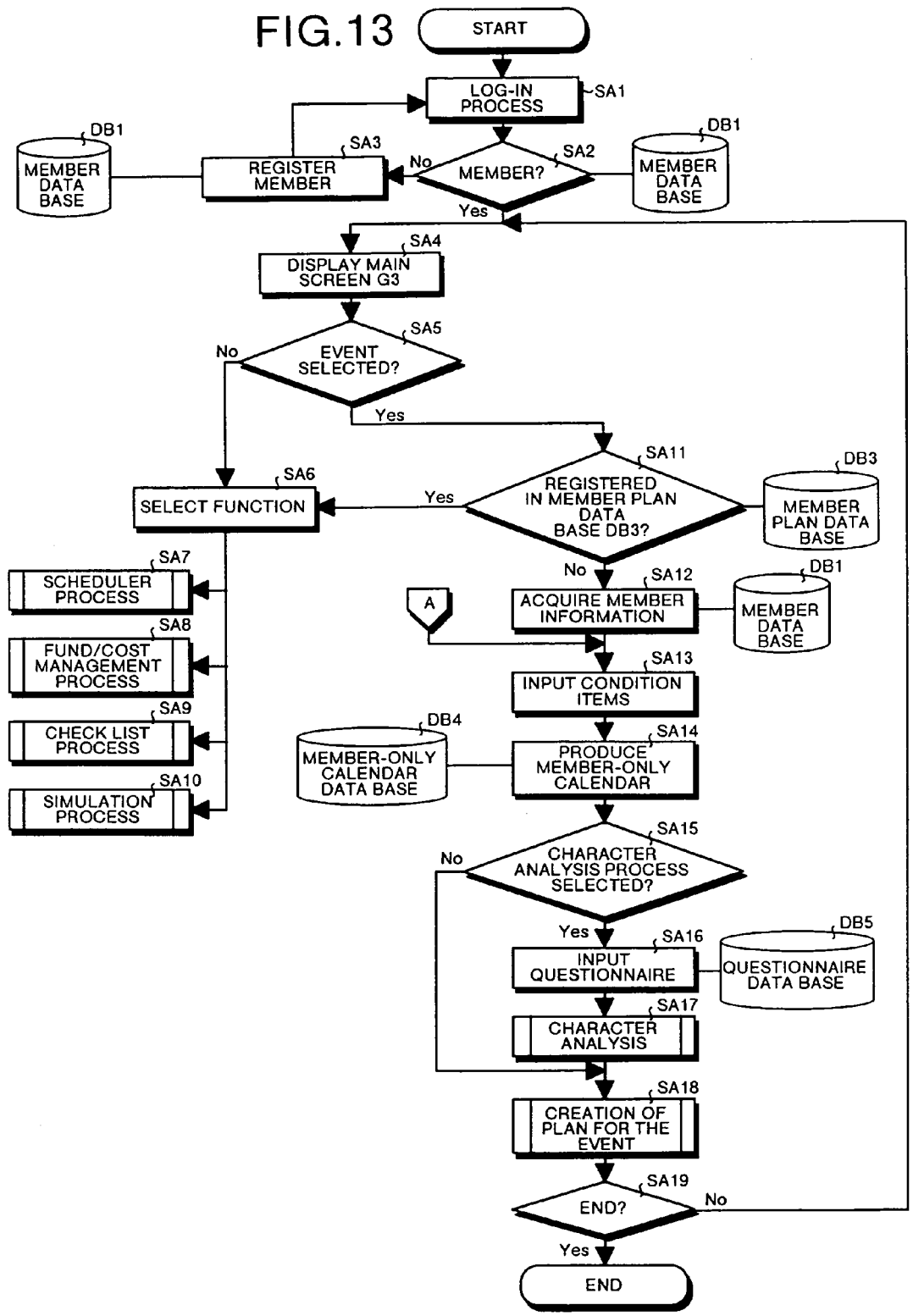

FIG.15

G2 ; MEMBERSHIP REGISTRATION SCREEN

CHECK CONDITIONS AND FILL IN AS REQUIRED

CONDITIONS FOR REGISTRATION

XXXXXXXXXXXXXXXXXXXXXXXXXXXXXX
XXXXXXXXXXXXXXXXXXXXXXXXXXXXXX
XXXXXXXXXXXXXXXXXXXXXXXXXXXXXX
XXXXXXXXXXXXXXXXXXXXXXXXXXXXXX

- ID
- PASSWORD
- REENTER PASSWORD
- E-MAIL
- NAME
- ZIP CODE
- ADDRESS
- SEX ▼ DATE OF BIRTH 19☐ 年 ▼ 月 ☐ 日
- LINE OF BUSINESS ▼
- JOB SPECIFICATION ▼

REGISTRATION — T

FIG.17

G4 ; CONDITION ITEM INPUT PROCESSING SCREEN

AUTOMATIC PLANNING OF A MARRIAGE CEREMONY

SCHEDULED DATE  19 [ ] 年 [▶] 月 [ ] 日

TOTAL BUDGET [            ]

HOLIDAY SETTING

○ MONDAY   ○ TUESDAY   ○ WEDNESDAY   ○ THURSDAY
○ FRIDAY   ● SATURDAY   ● SUNDAY

[ OK ] — F

FIG.27
G6 ; DETAILED DISPLAY SCREEN
DETERMINE HALL CANDIDATES
   DETERMINE WEDDING HALL CANDIDATES USING CATALOGS AND LITERATURE AND INTERNET. IN ORDER TO HOLD THE WEDDING CEREMONY AS DESIRED BY YOU,————————————————————
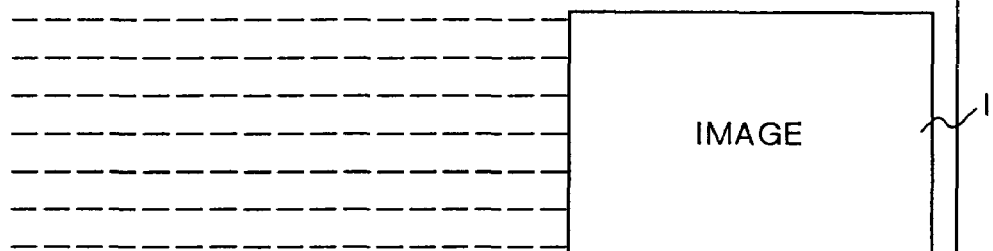
WE HAVE DETAILED DATA ON 1500 PRIVATE HALLS, 800 PUBLIC HALLS, 750 HOTELS, 500 RESTAURANTS AND 1200 OVERSEAS HALLS. LOOK FOR A HALL MOST SUITABLE TO YOU USING THE SEARCH ENGINE BELOW!
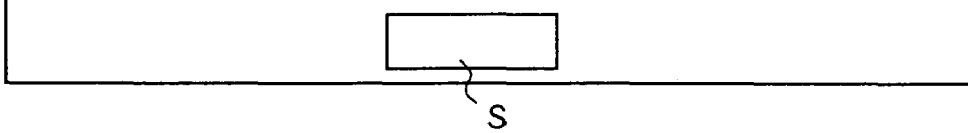

FIG.30

G7 ; PLAN DISPLAY SCREEN

| SEPTEMBER 1999 ||||||| 
|---|---|---|---|---|---|---|
| SUN | MON | TUE | WED | THU | FRI | SAT |
| | | | 1 | 2 | 3 | 4 |
| 5 | 6 | 7 | 8 | 9 | 10 | 11 |
| 12 | 13 | 14 | 15 | 16 (CLICK) | 17 | 18 |
| 19 | 20 | 21 | 22 ADDRESS GIVEN | 23 WEDDING CEREMONY | 24 HONEY-MOON | 25 |
| 26 | 27 | 28 | 29 | 30 | | |

(DETAILED DISPLAY)

G8 ; DETAILED PLAN DISPLAY SCREEN

| CEREMONY PLAN ||||
|---|---|---|---|
| ITEM | SHOP | PRICE | BREAKDOWN |
| CEREMONY | A HOTEL | 150,000 | CHRISTIAN STYLE |
| EATABLE | A HOTEL | 1,240,000 | |
| BEVERAGE | A HOTEL | 240,000 | 000 (FREE BEVERAGE) |
| BRIDEGROOM DRESS | RENTAL HOUSE | 50,000 | |
| BRIDE DRESS | RENTAL HOUSE | 250,000 | |
| ⋮ | ⋮ | ⋮ | ⋮ |
| CAKE | CAKE HOUSE | 80,000 | |
| SERVICES | A HOTEL | 33,000 | |
| TOTAL | | 3,000,000 | |

AUTOMATIC PLANNING APPARATUS AND COMPUTER PRODUCT

FIELD OF THE INVENTION

The present invention relates to an automatic planning apparatus and a computer product contained a program used to automatically construct a schedule for an event taking the character of the user into account.

BACKGROUND OF THE INVENTION

In the conventional practice of planning a given event, a planner collects the required information from magazines, home pages, etc. and constructs a schedule based on the information after trials and errors. This conventional practice is accompanied by various jobs and the very work of constructing a schedule is cumbersome, which often leads to a planning failure. When constructing a life cycle plan, for example, a very troublesome planning is required for each separate item of events of different types such as marriage, purchase of a residential house, education, etc. In view of this, it has been earnestly desired to develop an apparatus and a method by which the planning job can be easily carried out and the service of constructing a total planning including the life cycle plan can be offered.

Thus, in the conventional practice, a planner collects the required information from magazines, home pages, etc., and based on this information, constructs a plan for a given event (such as marriage, childbirth, purchase of a house or a funeral). Especially when using the home pages, the planner browses the home pages related to the event using a search engine while collecting the required information (names and addresses of suppliers, cost, delivery time, etc.).

An actual plan is discussed from all the angles taking the budget and schedule based on the information collected from homes pages, etc. into account. Usually, the result of planning is noted down in a diary having a calendar or stored in an electronic notebook or a computer as an electronic file. The planner, after checking the schedule in the diary and other references, takes an action and executes the plan by reserving or purchasing items for the particular event.

An event reservation system which enables the preparation for an event to be promoted positively is disclosed in Japanese Patent Application Laid-Open (JP-A) No. 11-120237. This event reservation system has a configuration of client/server type, and if there is any item that need to be taken care of before and/or after an event, the fact is notified to the client of the user through the Internet.

Thus, conventionally, the planner is required to carry out such troublesome work as collection of information, reservation and schedule management. The amount of workload on the planner disadvantageously increases in proportion to the scale of the proposed event.

When collecting the information using home pages, on the other hand, the fact that each home page is independent makes it necessary to collect information over a plurality of home pages. In addition, this job is inconvenient as individual homes pages must be opened once again separately when making a reservation or a purchase for the event. When the result of planning is stored on a paper in the form of a diary, there is a great likelihood that the diary is lost. Further, the prior art lacks the service of totally supporting the life cycle planning or the like service.

The event reservation system disclosed in JP-A No. 11-120237 is effective simply for keeping the preparation for the event in memory. In any way, the planner must construct a plan by himself (or herself), and therefore none of the above-mentioned problems and disadvantages are obviated.

SUMMARY OF THE INVENTION

It is an object of the present invention to provide an automatic planning apparatus and a computer product containing a program permitting the user to construct a plan positively in a way suitable to him in simplistic fashion while at the same time improving the convenience and the operating ease on the part of the user.

In order to achieve the object described above, according to one aspect of the present invention, an automatic planning apparatus is connected to at least one client through the Internet. The clients are operated by the users. A questionnaire unit creates and asks some questions to the user. The user answers the questions and also inputs certain initial conditions required for preparation and execution of the event. An analysis unit analyzes the answers to the questions and determines a property of the user. A planning unit automatically creates a schedule for the preparation of an event desired by the users after taking the input initial conditions and the property of the user into consideration. Thus, the present invention permits a plan to be automatically formed simply by answering a questionnaire and inputting the required initial conditions.

Further, the plan data corresponding to the user pattern is stored in a storage unit in advance and a schedule is formed according to the stored plan data.

Further, upon request from the user, the planning unit supplies the user with detailed data in addition to the plan data.

Further, a reporting unit notifies the user of the items to be processed by the user in the schedule and also manages the results of planning. Therefore, the user can process the particular items positively, and the user is not required to maintain the results in diary or the like.

Further, a reservation unit receives the reservation from the user in the case where the schedule contains any items to be reserved beforehand.

Further, a purchase unit receives a request for the purchase of an article and/or service from the user in the case where the schedule contains any items for which the article and/or the service, as the case may be, is to be received.

Further, a payment unit receives the on-line payment of the charge accrued in the purchase of an article and/or a service.

Further, the event is one of various life cycle events and the planning unit forms a schedule for the jobs ranging from the preparation for to the execution of the various events in the life cycle of the user. The events such as marriage, child birth, purchase of a house, funeral, etc. can be considered.

According to another aspect of the present invention, a computer readable medium stores instructions, which when executed by a computer, causes the computer to perform the steps of, creating and providing a questionnaire to a user for analysis of the user through said network; analyzing the user based on a predetermined analysis method by considering the answers to the questionnaire; inputting initial conditions required for executing the planning for an event desired by the user; and planning a schedule for the preparation and execution of the event based on the input initial conditions and the analysis of the user. Thus the method can be easily and automatically executed on a computer.

Other objects and features of this invention will become apparent from the following description with reference to the accompanying drawings.

BRIEF DESCRIPTION OF THE DRAWINGS

FIG. 2 is a diagram showing an example of the member data base DB1.

FIG. 3 is a diagram showing an example of the main plan data base DB2.

FIG. 4 is a diagram showing an example of the member plan data base DB3.

FIG. 5 is a diagram showing an example of the member-only calendar data base DB4.

FIG. 6 is a diagram showing an example of the questionnaire data base DB5.

FIG. 7 is a diagram showing an example of the ceremonial hall data base DB6.

FIG. 8 is a diagram showing an example of the hall charge data base DB7.

FIG. 9 is a diagram showing an example of the hall reservation situation data base DB8.

FIG. 10 is a diagram showing an example of the commodity data base DB9.

FIG. 11 is a diagram showing an example of the plan item data base DB10.

FIG. 12A is a diagram showing an example of the weight data base DB11 and FIG. 12B is an example of the weight data base DB12.

FIG. 13 is a flowchart for explaining the operation.

FIG. 15 is a diagram showing an example of the membership registration screen G2.

FIG. 17 is a diagram showing an example of the condition item input processing screen G4.

FIG. 27 is a diagram showing an example of the detailed display screen G6.

FIG. 30 is a diagram showing an example of the plan display screen G7 and the plan detail display screen G8.

DESCRIPTION OF THE PREFERRED EMBODIMENTS

An automatic planning apparatus and a computer readable recording medium for recording an automatic planning program according to the present invention will be explained in detail below with reference to the accompanying drawings.

Figure 1:
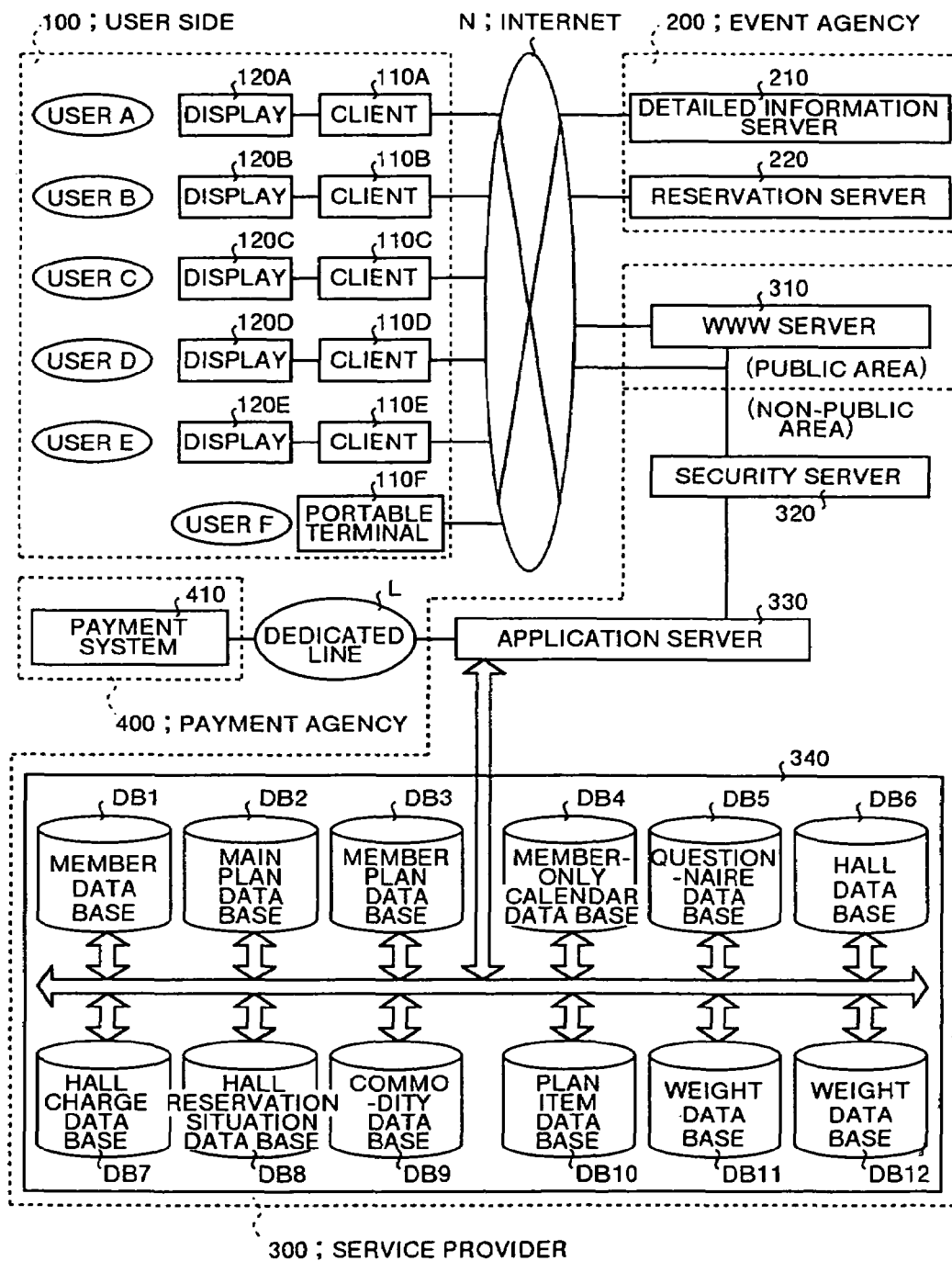
FIG. 1 is a block diagram showing a configuration according to an embodiment of the present invention.

FIG. 1 is a block diagram showing a configuration according to an embodiment of the present invention. FIG. 1 shows a system which provides a service that supports the life cycle plan of the user through a portal site installed on the Web. The life cycle plan means a plan of the events almost all the humans are expected to encounter during their life (such as the wedding ceremony, purchase of the residential house, child birth, education, adults' day ceremony, starting the career, funeral, etc.). As described in detail later, this embodiment has the feature that the planning that has thus far been performed by the user 100 is performed by the service provider 300.

A client/server system interconnected through the Internet N is shown in FIG. 1 as a means for providing the services described above. Clients 110A to 110E are computer terminals arranged on the side of the users A to E, respectively, on the user side 100. These clients 110A to 110E are connected with display units 120A to 120E, respectively, for displaying the web page supplied at the portal site.

The LCD (liquid crystal display) unit or the CRT (cathode ray tube) is used as the display units 120A to 120E. Each of the clients 110A to 110E can access the web page supplied at the portal site by accessing the WWW (World Wide Web) server 310 through the Internet N based on the URL (Uniform Resource Locator) for specifying the portal site on the WWW server 310. Thus, the users can browse the web pages. At the time of browsing, a program called the browser, for example, is activated which can open files in HTML (Hypertext Markup Language) format.

A portable terminal 110F is carried by the user F, and accesses the WWW server 310 through the Internet N due to the communication function based on TCP/IP. The portable terminal 110F includes a portable telephone terminal with a browser and a portable information equipment called PDA (Personal Digital Assistance). TCP/IP (Transmission Control Protocol/Internet Protocol) is used as the communication protocol of the clients 110A to 110E and the portable terminal 110F.

In the event agency 200, the detailed information server 210 provides the detailed information required for holding an event. An event is a wedding ceremony, purchase of a house, child birth, the funeral, etc. in the life cycle plan. Thus, the event agency includes the marriage related agents, real estate companies, hospitals and funeral parlors. Take the wedding ceremony as an example of the event. The detailed information on this event includes the name of the where the ceremony is held hall, the zip code, the address, the telephone number and various charges. A reservation server 220 manages the reservation for various items (including the rent of the hall and the wedding dress) for the wedding ceremony through the Internet N.

In the service provider 300, a WWW server 310 is provides the portal site to the users A to F, and it is accessed by the clients 110A to 110E and the portable terminal 110F through the Internet N. In this way, the WWW server 310 is installed in a public area accessible from outside.

A security server 320 is arranged between the public area and the non-public area in the service provider 300, and functions as a fire wall. The security server 320 prohibits the access from the external client 110A to the application server 330 installed in the non-public area on the one hand, and permits the access from an application server 330 provided internally to the WWW server 310.

The application server 330 executes various processes required for administration of the portal site using the member data bases DB1 to the weight data base DB12 stored in the storage unit 340. This application server 330 is connected to the payment system 410 through a dedicated line L. This payment system 410 is provided at the payment agency 400 and settles the account on-line by a credit card. The operation of the application server 330 will be explained in detail later.

The member data base DB1 shown in FIG. 2 includes the basic information on the members (users) registered in the portal site supplied from the WWW server 310. Specifically, in the member data base DB1, a record having the fields of the membership ID, password, name, age, sex, zip code, address, date of birth and telephone number is stored for each member.

The membership ID is a unique identifier assigned to each member and used for identifying the particular member among a plurality of members. The password is used for authenticating the user at the time of log-in to the portal site. For example, a member having the membership ID of ZZZZZ, password "etobaoba", name Taro Nihon, age 26, sex male, zip code 35101354, address No. 1, Hon-cho 1-1, Wako City, Saitama Prefecture, Japan, date of birth Oct. 6, 1973, and telephone number 0486532145 are recorded. The main data base DB2 to the weight data base DB12 shown in FIG. 3 to FIG. 12 will be described in detail later.

Operation of this embodiment will be explained with reference to the flowchart of FIG. 13. The description is made below with reference to the case in which the user A shown in FIG. 1 can receive various services by use of the portal site. In FIG. 1, the user A, after causing the client 110A to access the Internet N by dial up, inputs the URL of the portal site on the WWW server 310 by way of the keyboard (not shown). As a result, the client 110A is connected with the WWW server 310 through the Internet N, so that the application server 330 proceeds to step SA1 shown in FIG. 13 and executes the log-in process.

Figure 14:
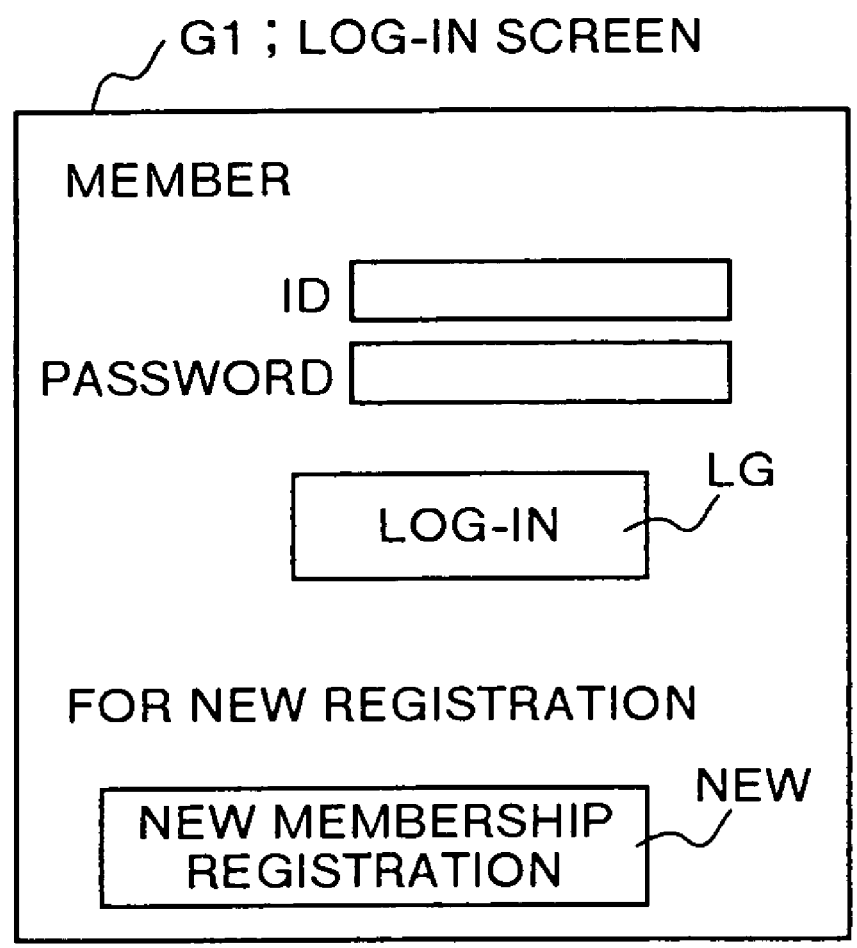
FIG. 14 is a diagram showing an example of the log-in screen G1.

In other words, in step SA1, the log-in screen G1 shown in FIG. 14 is displayed on the display unit 120A of the client 110A. An ID input column corresponding to the membership ID (see FIG. 2), a password input column corresponding to the password (see FIG. 2), a log-in soft button LG for indicating the log-in and a soft button NEW for registering a new member or not are displayed on the log-in display screen G1.

Assume that the user A has been already registered as a member. The user A enters "ZZZZZ" as the membership ID in the ID input column shown in FIG. 14, the password "etobaoba" in the password input column, and then clicks the log-in soft button LG using a not shown mouse.

As a result, the application server 330 proceeds to step SA2, at which the member database DB1 shown in FIG. 2 is compared with the ID number and the password input by the user A thereby to determine whether the user A is the member or not. In this case, the member ID of ZZZZZ, the password "etobaoba" in the member data base DB1 shown in FIG. 2 coincide with the membership ID of ZZZZZ and the password "etobaoba" input by the user A, and therefore the result of determination in step SA2 will be YES.

If the user A clicks the new member registration soft button NEW on the log-in screen G1 shown in FIG. 14, on the other hand, the result of determination in step SA2 will be NO. In this case the application server 330 proceeds to step SA3 and executes the member registration process. In other words, the member registration screen G2 shown in FIG. 15 is displayed on the display unit 120A of the client 110A in step SA3.

This member registration screen G2 has an ID input column for inputting the membership ID (see FIG. 2), a password input column for inputting the password (see FIG. 2), a password reentry column, an E-mail input column for inputting the E-mail address, a name input column, a zip code input column, an address input column, a sex input column, a data of birth input column, a line of business input column, a type of job input column and a registration soft button T.

The user A inputs the information about himself in the respective input columns on the member registration screen G2 using the keyboard, and then clicks the registration soft button T using the mouse. As a result, the application server 330 registers the information input by the user A in the member data base DB1. The application server 330 then sends a message indicating the end of the registration process to the client 110A through the Internet N, and returns to the process in step SA1.

Figure 16:
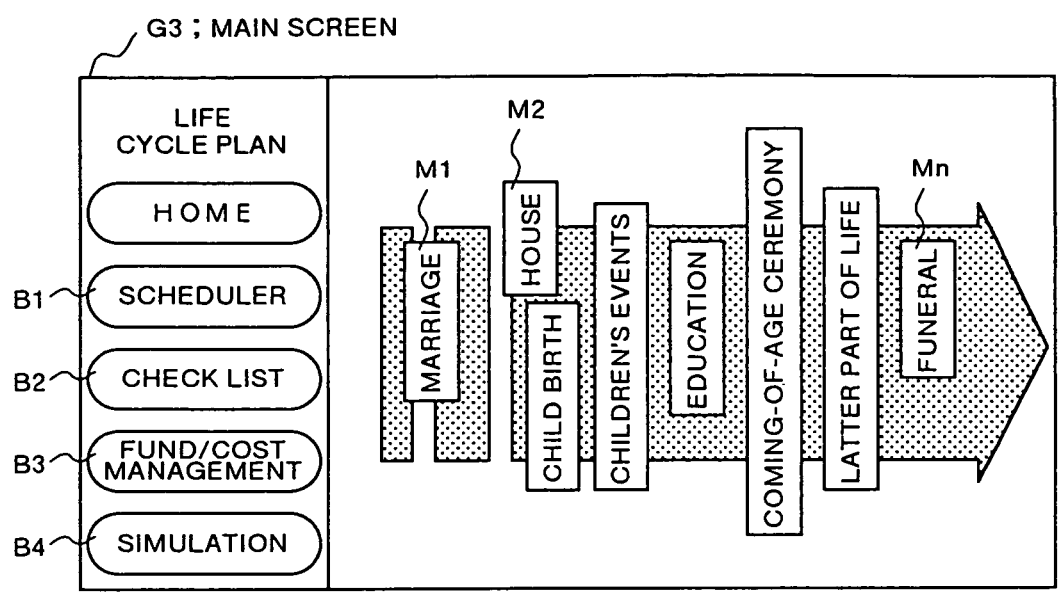
FIG. 16 is a diagram showing an example of the main screen G3.

In step SA4, on the other hand, the main screen G3 for the life cycle plan shown in FIG. 16 is displayed on the display unit 120A of the user A who has completed the log-in. This main screen G3 has displayed thereon the marriage item M1, the house item M2, . . . , the funeral item Mn, etc. corresponding to the wedding ceremony, the purchase of a house, . . . and the funeral, respectively, as events which the user of the portal site may encounter in his (or her) life. Further, the main screen G3 has displayed thereon the scheduler function select soft button B1, the check list function select soft button B2, the fund/cost management function select soft button B3 and the simulation function select soft button B4.

The scheduler function select button B1 is clicked when the scheduler function is selected. The scheduler function is for scheduling the events for each user in time series. The check list function select soft button B2 is clicked when the check list function is selected. The check list function includes the function of producing a list of preparatory matters to be executed by the user for executing an event (such as a wedding ceremony) and the function attaching a check mark to the matters that have been executed in this list. This check list function is for preventing the failure of the preparatory matters by accurately grasping the progress of the matters required to be performed for executing an event.

The fund/cost management function select soft button B3 is clicked when selecting the fund/cost management function. This fund/cost management function is for managing the fund, expenses and budget for executing an event. Take the wedding ceremony as an example of the event. The items managed by the fund/cost management function include the total asset, minimum amount of expenses, budget and the receipts and disbursements.

The total asset is the total sum of the amount saved by the two who are going to marry and the money sent from their parents in assistance. The minimum amount of expenses is the total sum of the living cost and the insurance premiums required for the two persons before marriage. The budget is an estimated amount of the preparatory cost for the marriage. The receipts and disbursements is the budget and the actual expense. The simulation function select soft button B4 is clicked when selecting the simulation function. This simulation function is for simulating a series of matters from the preparation to the execution of the event planned by animation.

Once the main screen G3 is displayed on the display unit 120A, the application server 330 proceeds to step SA5 and determines whether the event is selected or not. Specifically, the application server 330 determines whether any of the marriage item M1 to the funeral item Mn shown in FIG. 16 has been clicked. In the case where the marriage item M1 is clicked by the user A, for example, the application server 330 determines "YES" the answer in step SA5.

In step SA11, the application server 330 accesses the member plan data base DB3 (see FIG. 4) and determines whether the member plan exclusive to the user A is registered in the member plan database DB3. Since marriage is taken as an example of the event, the member plan is for the marriage of the user A. In the member plan data base DB3 shown in FIG. 4, a record configured with the fields including the item code, the scheduled date of executing the plan, the note whether the plan is executed or not, the budget for the plan and the ratio of the budget for the plan which represents of the total budget amount is stored for each item code.

Assume that the member plan exclusive to the user A is not registered in the member plan data base DB3. The application server 330 determines "NO" as the answer in step SA11, and proceeds to step SA12. In the case where the determination in step SA11 is "YES", the application server 330 proceeds to step SA6.

In step SA12, the application server 330 accesses the member data base DB1 shown in FIG. 2 and after thus acquiring the member information with the membership ID (=ZZZZZ) of the user A as a key, proceeds to step SA13. The member information thus acquired includes the name (Taro Nihon), age (26), sex (male), address (No. 1, Kasumigaseki 1-1, Chiyoda-ku, Tokyo), zip code (35101354), date of birth (Oct. 6, 1973) and telephone number (0300001111).

In step SA13, the application server 330 executes the condition item input process for causing the user A to input the condition items required for planning an event (wedding ceremony in this case). As a result, the condition item input processing screen G4 shown in FIG. 17 is displayed on the display unit 120A of the user A. The condition item input processing screen G4 has displayed thereon the title ("automatic planning of a marriage ceremony"), a scheduled date input column for inputting the scheduled date of the marriage, a total budget input column for inputting the budget for the marriage, a holiday setting column for setting holidays of the user A. A completion soft button F is provided which is clicked upon input of the all the items.

In the case under consideration, the user A enters the scheduled date of marriage and the total budget in the scheduled date input column and the total budget input column, respectively, on the condition item input processing screen G4 using the keyboard or the mouse. Further, the user A sets Saturday and Sunday as the holidays in the holiday setting column using the mouse, and then clicks the completion soft button F using the mouse.

In step SA14, the application server 330, based on the holidays input by the user A set in step SA13, produces a member-only calendar including the date and the attribute thereof (holiday or week day) as shown in FIG. 5. This member-only calendar is specially customized taking the holidays and week days unique to the user A into consideration. Then, the application server 330 relates the member-only calendar to the membership ID of the user A and registers it in the member-only calendar data base DB4 shown in FIG. 5.

In step SA15, the application server 330 determines whether the character analysis process is selected by the user A or not. This character analysis process is for analyzing the character of the user A from the answers to a questionnaire for character analysis, for example. This questionnaire will be explained in detail with reference to step SA16 later. Soft buttons for selecting whether the character analysis process is to be performed or not is displayed on the display unit 120A of the user A. Assuming that the soft button indicating that the character analysis process is not to be performed is clicked by the user A using the mouse, the application server 330 determines "NO" as the answer in step SA15 and proceeds to step SA18.

Assume that the user A clicks the soft button which commands that the character analysis process is to be performed. In this case, the application server 330 determines the answer in step SA15 as "YES". In step SA16, the application server 330 executes the questionnaire input process for causing the user A to input the answers to the character analysis questionnaire.

Specifically, in step SA16, the application server 330 acquires the questionnaire information from the questionnaire data base DB5 (see FIG. 6), and outputs it to the WWW server 310 through the security server 320. The questionnaire data base DB5 shown in FIG. 6 includes the questionnaire information required for causing the user to answer the character analysis questionnaire.

In the questionnaire data base DB5, a record configured with the fields of ID, item, file type, file name, choice A, choice B, choice C, choice D and choice E is stored for each ID. The ID is an identifier attached to each of a plurality of the questionnaires. The items indicate specific contents of the questionnaire. The file type is the type of the file storing the questionnaire. The file name is the name of the file storing the questionnaire. The choices A to E correspond to those choices for giving an answer to the questionnaire of multiple answer type.

As to the record with ID of 1, for example, the item is "Do you ever give your opinion when others are speaking?", the file type is the still image, the file name is q0001, the choice A is "YES", the choice B is "NO", the choices C, D and E are NULL.

When the questionnaire information on this record is output to the WWW server 310, therefore, the question "Do you ever give your opinion when others are speaking?", a soft button for selecting "YES" and a soft button for selecting "NO" are displayed on the display unit 120A of the user A. In other words, the questionnaire of ID of 1 is of alternative type for selecting one of the two answers "YES" and "NO". In the case under consideration, the user A selects "YES" as the answer to the question of ID of 1.

The contents of the questionnaire and the choices including and subsequent to ID of 2 shown in FIG. 6 are displayed on the display unit 120A of the user A. At the same time, as the user A selects a choice, the questionnaire is answered. Upon giving an answer to the questionnaire of ID of 125 shown in FIG. 6, the application server 330 proceeds to step SA17 for executing the character analysis process.

Figure 18:
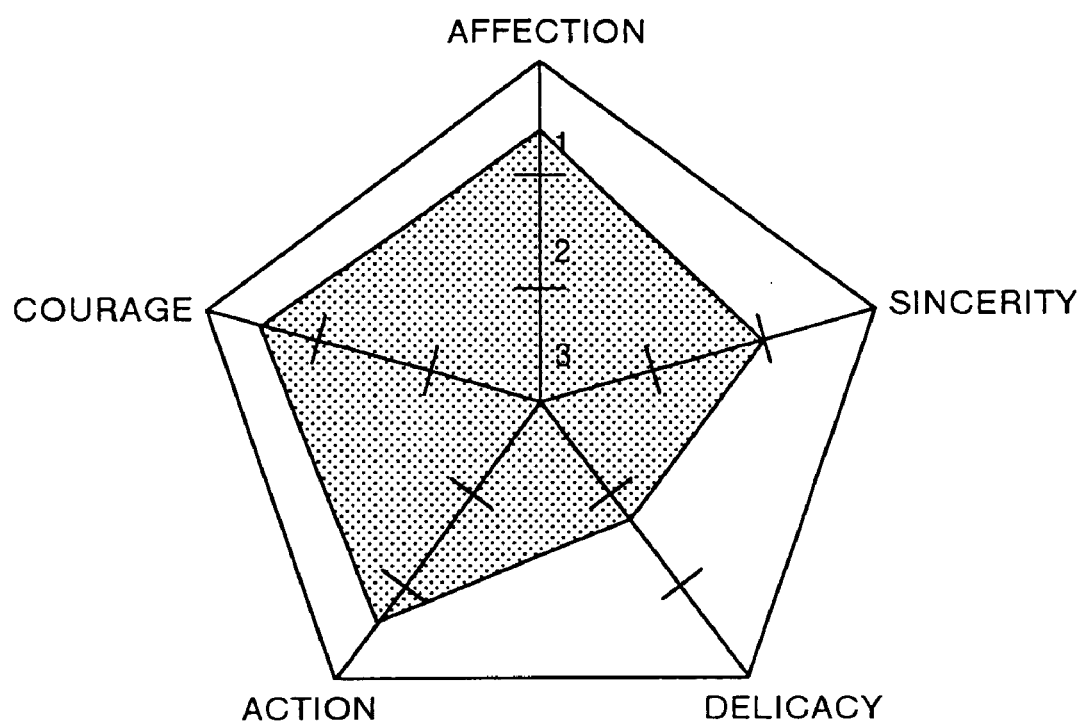
FIG. 18 is a diagram showing an example of the result of analysis of the character shown in FIG. 13.
Figure 20:
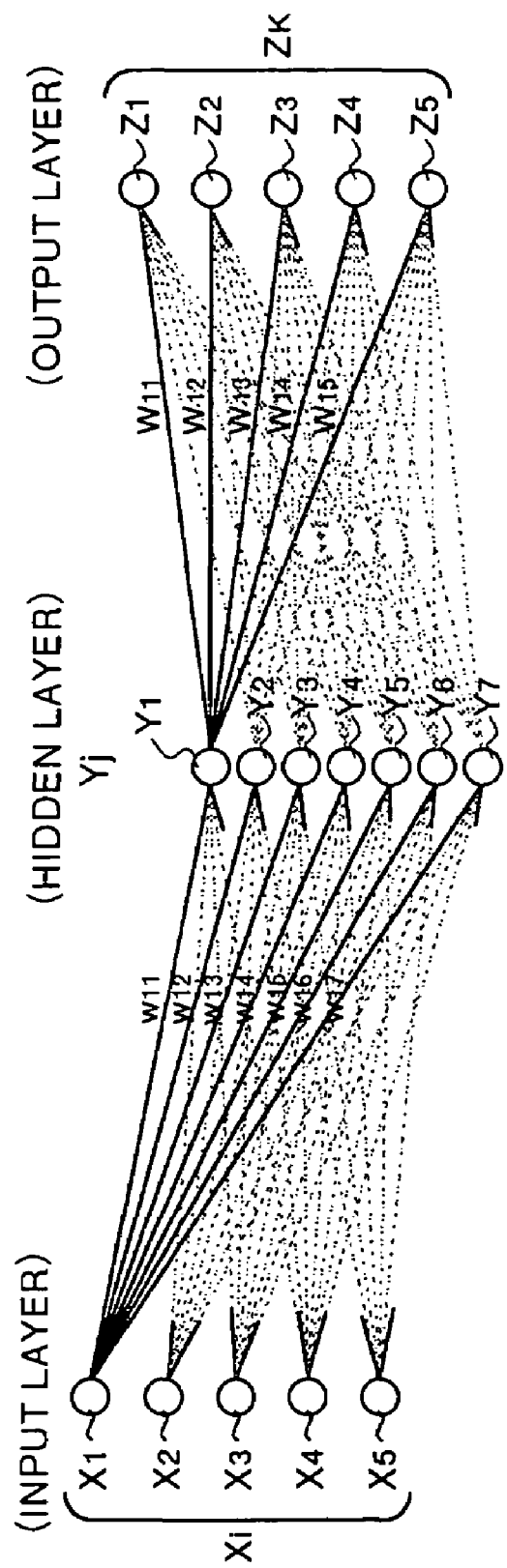
FIG. 20 is a diagram for explaining a method of calculating the output value $Y_j$ in the hidden layer and the output value $Z_k$ in the output layer shown in FIG. 19.

This character analysis process is for analyzing the character of the user A using the answers of the questionnaire in step SA16 and the neural network shown in FIG. 20, and the result of analysis is indicated by a pentagonal radar chart shown in FIG. 18. This radar chart is for expressing five factors of the human character including affection, sincerity, delicacy, action and courage. Further, each of affection, sincerity, delicacy, action and courage is expressed in three levels of 1 to 3. Thus, there are 243 ($3^5$) combinations of the three levels and the five factors.

Figure 19:
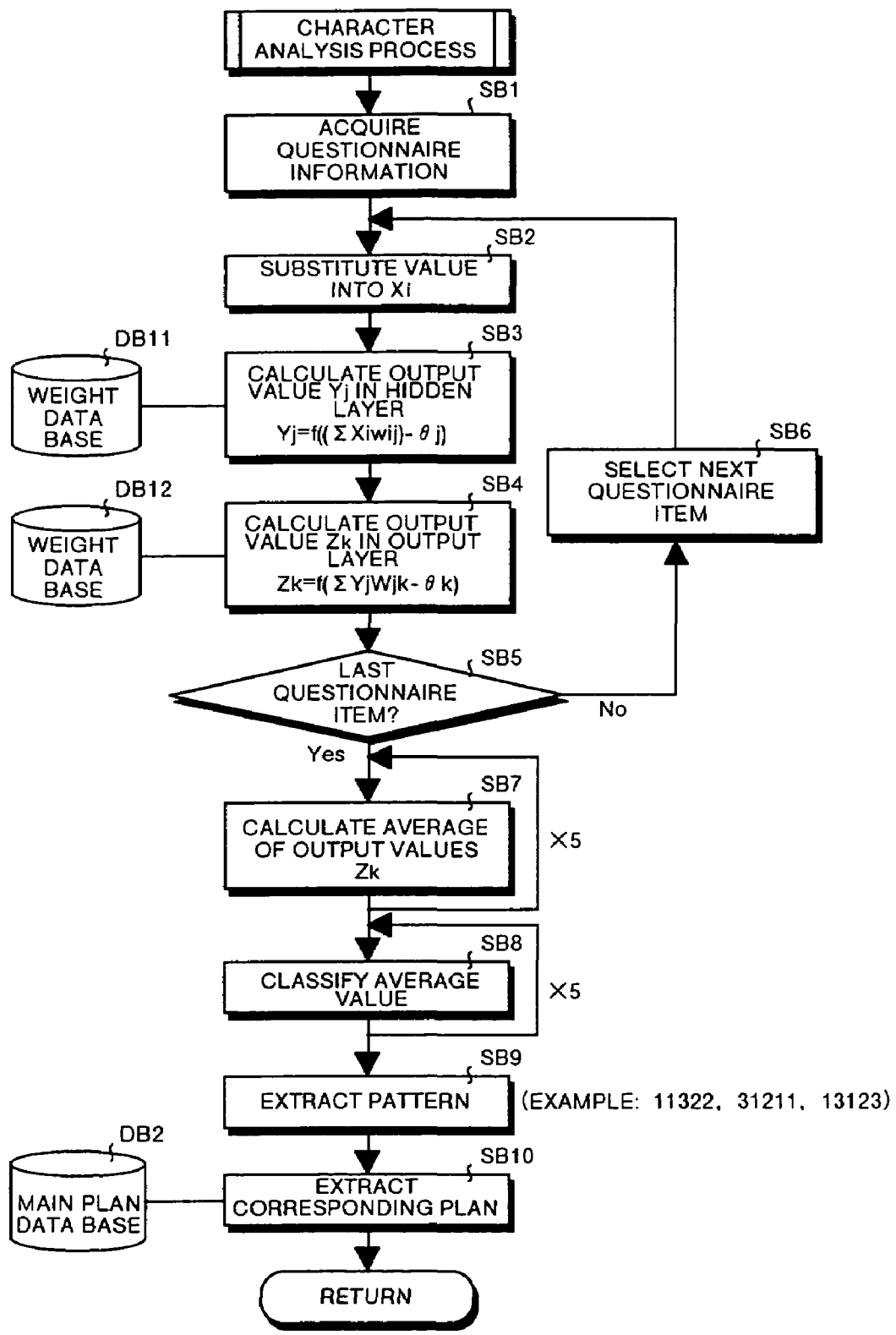
FIG. 19 is a detailed flowchart of the character analysis process shown in FIG. 13.

The character analysis process in step SA17 will be explained here in detail with reference to the flowchart of FIG. 19. In step SB1 of FIG. 19, the application server 330 acquires the questionnaire information configured with the answers to the questionnaire given by the user A in step SA16 of FIG. 13 from the WWW server 310.

In step SB2, the application server 330 substitutes a value (0 or 1) into the input value $X_i$ (i=1 to 5) of the neural network shown in FIG. 20. In the neural network, a value is substituted into the input value $X_i$ in the input layer thereby to calculate the output value $Y_j$ (j=1 to 7) in the hidden layer, after which the output value $Z_k$ (k=1 to 5) in the output layer is calculated. The input values $X_1$ to $X_5$ in the input layer correspond to the choices A to E, respectively, shown in FIG. 6. Also, in the case where the user A selects one of the choices A to E, the value 1 is substituted into the input value $X_i$ corresponding to the particular choice. For the choices not selected, on the other hand, 0 is substituted into the input value $X_i$.

In the case of 1D of 1, the choice A is selected, but none of the other choices B to E (NULL indicates no selection) is selected. Thus, for the questionnaire items corresponding to ID=1, the values 1, 0, 0, 0, 0 are substituted into the input values $X_1$ to $X_5$, respectively, shown in FIG. 20.

In the next step SB3, the application server 330 calculates the output value $Y_j$ ($Y_1$ to $Y_7$) in the hidden layer shown in FIG. 20 from equation (1) below.

$$Y_j = f\left(\left(\sum X_i \cdot w_{ij}\right) - \theta_j\right) \quad (1)$$
$$= 1/\left(1 + \exp\left(-\sum X_i \cdot w_{ij}\right) - \theta_j\right)$$

In equation (1), $X_i$ designates the input value in the input layer, and $\theta_j$ designates a threshold value. The right side is the sigmoid function. The character $w_{ij}$ designates the coupling weight between the input layer and the hidden layer, and is preset by the weight data base DB11 shown in FIG. 12A. In other words, the suffix i in the coupling weight $w_{ij}$ corresponds to the suffix i of the input value $X_i$ of the input layer shown in FIG. 20, and the suffix j corresponds to the suffix j of the output value $Y_j$ of the hidden layer.

Thus, the character $w_{11}$ shown in FIG. 20 designates the coupling weight between the input value $X_1$ (suffix i=1) of the input layer and the output value $Y_1$ (suffix j=1) of the hidden layer. This coupling weight $w_{11}$ assumes 1.20 for ID of 1 from the weight data base DB11 shown in FIG. 12A since i= 1 and j=1. The value ID shown in FIG. 12A corresponds to ID shown in FIG. 6. In similar fashion, the coupling weights $w_{12}$, $w_{13}$, and so forth shown in FIG. 20 assume the values of 0.95, 0.45 and so forth, respectively, for ID of 1 from the weight data base DB11. Also, as shown in FIG. 12A, in the case where ID=1 and j=1, the threshold value $\theta_1$ is 15.2.

The coupling weight $w_{ji}$ and the threshold value $\theta_j$ in the weight data base DB11 shown in FIG. 12A are determined from the values learned using the learning method for the neural network (the back propagation method, for example). In this way, the application server 330 calculates the output values $Y_j$ ($Y_1$ to $Y_7$) of the hidden layer from equation (1) for the questionnaire items corresponding to ID=1 shown in FIG. 6.

In step SB4, the application server 330 calculates the output value $Z_k$ ($Z_1$ to $Z_5$) of the output layer shown in FIG. 20 from equation (2) below.

$$Z_k = f((\Sigma Y_j \cdot W_{jk}) - \theta'_k) \quad (2)$$
$$= 1/(1 + \exp(-\Sigma Y_j \cdot W_{jk}) - \theta_k)$$

The output values $Z_1$ to $Z_5$ of the output layer correspond to the affection, sincerity, delicacy, action and courage, respectively, shown in FIG. 18 and values in real number in the range of 0 to 1. In equation (2), $Y_j$ designates an output value in the hidden layer, $\theta_k$ a threshold value, and $W_{jk}$ the coupling weight between the hidden layer and the output layer. The coupling weight $W_{jk}$ is preset by the weight data base DB12 shown in FIG. 12B. In other words, the suffix j in the coupling weight $W_{jk}$ corresponds to the suffix j of the output value $Y_j$ of the hidden layer shown in FIG. 20, and the suffix k corresponds to the suffix k of the output value $Z_k$ of the output layer.

Thus, $W_{11}$ shown in FIG. 20 is the coupling weight between the input value $Y_1$ (suffix j=1) of the hidden layer and the output value $Z_1$ (suffix k=1) of the output layer. This coupling weight $w_{11}$ assumes a value of 0.4 for ID of 1 from the weight data base DB12 shown in FIG. 12B since j=1 and k=1. In similar fashion, the coupling weights $W_{12}$, $W_{13}$, and so forth shown in FIG. 20 assume the values of 0.5, 0.4 and so forth, respectively, for ID of 1 from the weight data base DB12. Further, as shown in FIG. 12B, in the case where ID=1 and k=1, the threshold value $\theta_1$ is 38.2.

The coupling weight $W_{jk}$ and the threshold value $\theta_k$ in the weight data base DB12 shown in FIG. 12B are determined from the values learned using the learning method for the neural network (the back propagation method, for example). In this way, the application server 330 calculates the output values $Z_k$ ($Z_1$ to $Z_5$) of the output layer from equation (2) for the questionnaire items corresponding to ID=1 shown in FIG. 6.

In step SB5, the application server 330 determines whether the calculation up to steps SB2 to SB4 is complete or not for the last questionnaire item (ID=125 in this case) in the questionnaire data base DB5 shown in FIG. 6. Since the answer is "NO", the application server 330 proceeds to step SB6. In step SB6, the application server 330 selects the next questionnaire item (ID=2 in this case), and then returns to step SB2. After that, the application server 330 sequentially executes the calculation in steps SB2 to SB4 for the questionnaire items including and subsequent to ID=2.

Upon completing the calculation for the last questionnaire item shown in FIG. 6, the application server 330 determines the answer as "YES" in step SB5. In step SB7, the application server 330 calculates the average value of the output values $Z_k$ (k=1 to 5) calculated in step SB4.

Specifically, the average value of a total of 125 output values $Z_1$ corresponding to ID of 1 to 125, respectively, are calculated. The average value of the output value $Z_1$ corresponds to affection shown in FIG. 18. Also, the average value of a total of 125 output values $Z_2$ corresponding to ID of 1 to 125, respectively, is calculated. This average value of the output value $Z_2$ corresponds to sincerity shown in FIG. 18. In similar fashion, the average value of the output value $Z_3$ (delicacy), the average value of the output value $Z_4$ (action) and the average value of the output value $Z_5$ (courage) are calculated, respectively.

In the next step SB8, the application server 330 classifies the average values of the output values $Z_1$ to $Z_5$ calculated in step SB7 into an appropriate one of levels 1 to 3 shown in FIG. 18, and then proceeds to step SB9. Since the average value assumes a value of real number in the range of 0 to 1, level 1 is in the range of ⅔ to 1 inclusive, level 2 in the range of ⅓ to ⅔ not inclusive, and level 3 in the range of 0 to ⅓ not inclusive. Assuming that the average values of the output values $Z_1$ to $Z_5$ are as follow, the corresponding levels are given as

| (Average value of output $Z_k$) | (Level) |
|---|---|
| Average value of output $Z_1$ (affection) = 0.8 | 1 |
| Average value of output $Z_2$ (sincerity) = 0.66 | 1 |
| Average value of output $Z_3$ (delicacy) = 0.4 | 2 |
| Average value of output $Z_4$ (action) = 0.71 | |
| Average value of output $Z_5$ (courage) = 0.7 | 1 |

In step SB9, the application server 330 extracts the pattern of the character of the user A (hereinafter referred to as the character pattern) from the classification result in step SB8, and proceeds to step SB10. The character pattern as referred to herein is an enumeration of levels of affection, sincerity, delicacy, action and courage shown in FIG. 18. In this case, the affection is level 1, the sincerity is level 1, the delicacy is level 2, the action is level 1 and the courage is level 1. Thus, the character pattern of the user is "11211". As far as the user A is concerned, however, the explanation will be continued on the assumption that the character pattern of "11111" has been extracted.

In step SB10, the application server 330 extracts a marriage plan adapted to the character of the user from the main plan data base DB2 with the character pattern extracted in step SB9 as a key. The main plan data base DB2 shown in FIG. 3 is the one for the plan corresponding to the character pattern. In this main plan data base DB2, a record including the fields of plan code, character pattern, minimum preparation period and the pointer to the plan item data base is stored for each plan code.

The plan code is the code attached to a particular plan, the character pattern is that of the user (11111 to 33333), and the minimum preparation period is the minimum number of days expected to be required for preparation of the particular plan (the wedding ceremony in this case). The reason why the minimum preparation period is varied in this case is that the character of the user (carefree type or energetic type) is taken into account.

Specifically, in the plan of the user having the carefree character, a long minimum preparation period is set, while the minimum preparation period of the plan for the user having an energetic character is set to a short length. The pointer to the plan item data base is for indicating the storage area to store the plan item data base DB10 shown in FIG. 11. For the plan code of 001, for example, the character pattern is set to 11111, the minimum preparation period is set to 186 (days), and the pointer to the plan item data base is set to PPA. Also, the pointer PPA to the plan code of 001 in FIG. 3 is the pointer to the plan item data base DB10 shown in FIG. 11.

In FIG. 11, the plan item data base DB10 is the data base including the detailed plan items (the items for marriage in this case) corresponding to the character pattern of 11111. In this plan item data base DB10, a record including the fields of ID, code, attribute, level, class, designation, maximum number of days for preparation, cost ratio and detailed information link destination is stored for each ID.

The ID and the code are attached to the plan item, and the attribute indicates the specific contents of the plan item. The level indicates whether the particular plan item is displayed or not according to the length of the display period (June 1999 to December 1999 in the shown case) on the plan display screen G5. Specifically, in the case where the display period is long, the level of the particular plan item is set to 1, while in the case of a short display period, the level of the particular plan is set to 2. The class indicates the classification of the particular plan item.

The designation indicates the one as to whether the day of execution of the plan corresponding to the plan item is a holiday or not. The item of this designation is input by the user. The maximum number of days for preparation indicates the maximum number of days expected to be required for the preparation of the plan corresponding to the particular plan item. The maximum number of days for preparation=999999, indicates that the starting day of preparation is not limited. The cost ratio indicates the ratio of the cost corresponding to the particular item which represents of the total budget. In the case where the user is associated with the bridegroom, for example, the cost ratio is that of the cost to be burdened by the bridegroom side. The detailed information link destination is the URL for designating the site providing the detailed information on the plan item.

When ID is 1, for example, the code is set to 000132, the attribute requires that "the style, size and budget for the wedding ceremony and the wedding party are determined by discussion", the level is set to 1, the designation is "nil", the maximum number of days for preparation is 999999, the cost ratio is 0.00%, and the detailed information link destination is defined as http://www.xxx.co.jp/life/abc/def.html. Also, each record of the plan item data base DB10 corresponds to each record of the member plan data base DB3 shown in FIG. 4.

In the case under consideration, the character pattern of the user A is "11111" in step SB10 and therefore, the application server 330 extracts the plan of plan code=001 shown in FIG. 3 for the user A, and then returns to the main routine of FIG. 13. In the next step SA18, the application server 330 executes the process (see FIG. 21) creation of the plan for the particular event (the wedding ceremony in this case) corresponding to the user A taking the result of character analysis into account.

Figure 21:
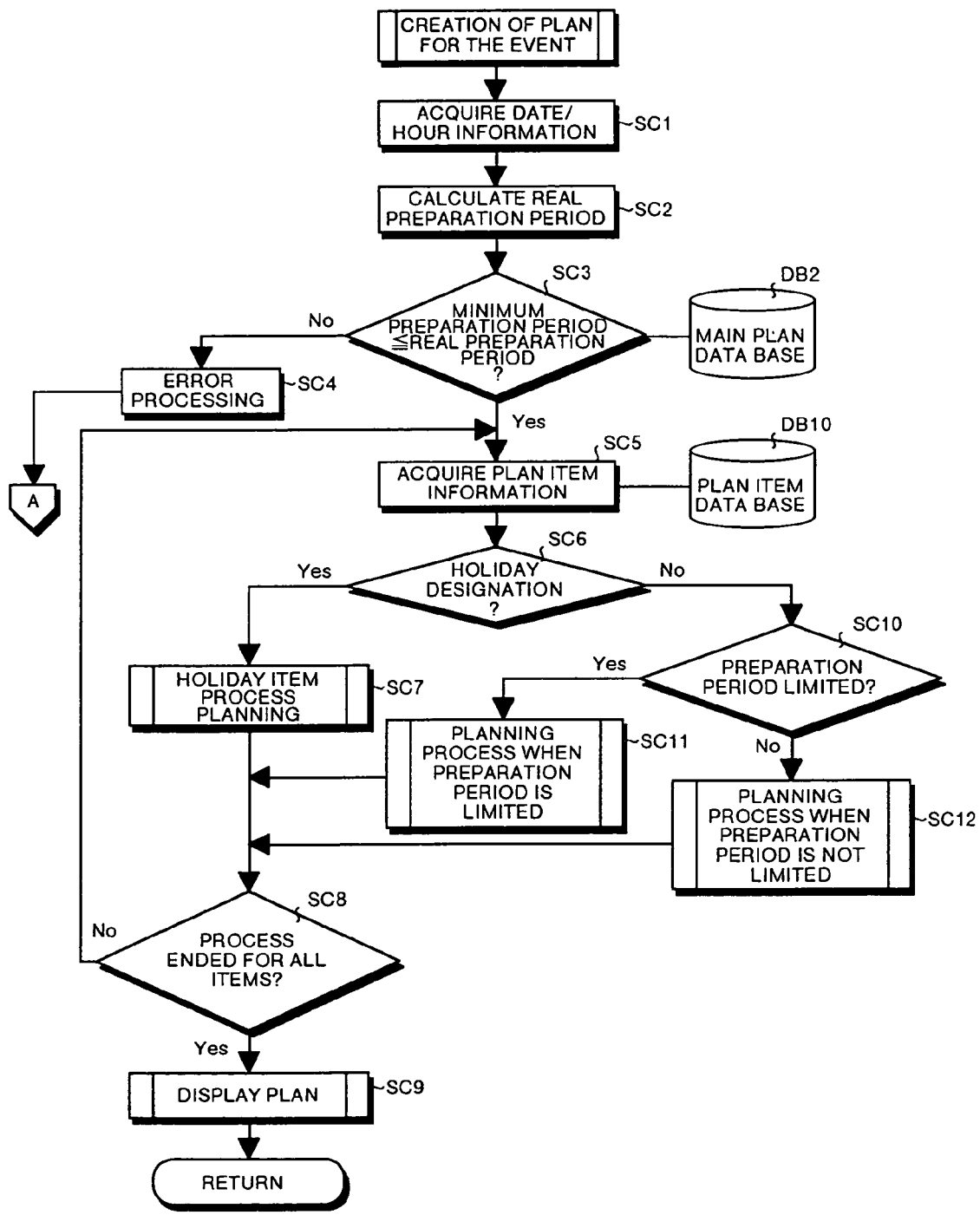
FIG. 21 is a detailed flowchart of the event plan creation process shown in FIG. 13.

Specifically, in step SC1 of FIG. 21, the application server 330 acquires the current date/hour/time information from a not shown timer. In step SC2, the application server 330 calculates a real preparation period as the difference between the scheduled date of the event (the wedding ceremony in this case) input by the user A in step SA13 and the today's date, and then proceeds to step SC3. This real preparation period is the time the user A can actually consume in preparation for the event (wedding ceremony).

In step SC3, the application server 330 first accesses the main plan data base DB2 thereby to acquire the information on the minimum preparation period for the event required by the user A. In this case, the application server 330 acquires the information as 186 (days) of the minimum preparation period corresponding to the plan code 001 shown in FIG. 3 based on the plan code extracted in step SB10. What should be noted here is that the minimum preparation period of 186 (days) is the preparation period which is supposed to be required by the character of the user A based on the result of the character analysis described above. Then, the application server 330 determines whether the real preparation period is equal to or longer than the minimum preparation period. In other words, it is determined whether the preparation period for the event is sufficiently long or not.

If the real preparation period is shorter than the minimum preparation period, the application server 330 determines the answer in step SC3 as "NO". In step SC4, the application server 330 executes the error processing by displaying the information to the effect that the preparation period is insufficient on the display unit 120A of the user A, and then proceeds to step SA13 shown in FIG. 13 for executing the condition item input process described above. As a result, the user A reenters the scheduled date on the condition item input processing screen G4 shown in FIG. 17 in the same manner as described above.

On the other hand, assume that the real preparation period is equal to or longer than the minimum preparation period. The application server 330 determines the answer in step SC3 as "YES". In step SC5, the application server 330 accesses the plan item data base DB10 shown in FIG. 11 based on the pointer to the plan item data base (PPA) corresponding to the plan code 001 shown in FIG. 3, and after thus acquiring the plan item information of ID=1.

In step SC6, the application server 330 determines whether a holiday is designated by the user A as the day on which the plan is scheduled to be executed. In the case under consideration, the (holiday) designation in the record of ID=1 of the plan item data base DB10 shown in FIG. 11 is "NIL", and therefore the application server 330 determines the answer in step SC6 as "NO".

In step SC10, the application server 330 determines whether there is a limit to the preparation period for the plan item of ID=1 (see FIG. 11). In the case where there is no limit to the preparation period, "999999" is set in the field of maximum number of days for preparation shown in FIG. 11. In the case where there is a limit to the preparation period, on the other hand, a numerical value other than "999999" is set in the same field. In this case, since the maximum number of days for preparation is set to "999999" in the record of ID= 1 shown in FIG. 11, the application server 330 determines the answer in step SC10 as "NO".

Figure 24:
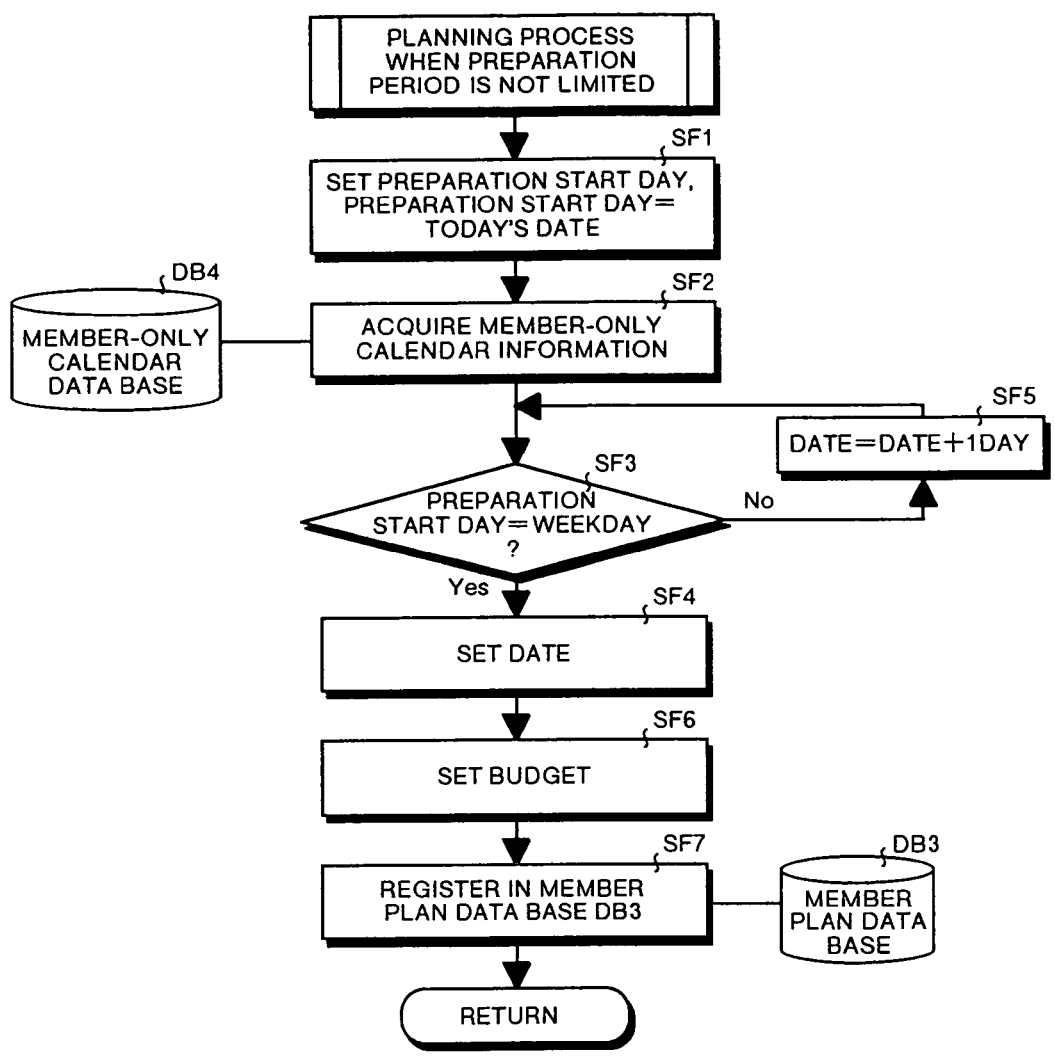
FIG. 24 is a detailed flowchart of the planning process when the preparation period is not limited shown in FIG. 21.

In step SC12, the application server 330 executes the planning process (see FIG. 24) in the absence of a limit to the preparation period. Specifically, in step SF1 shown in FIG. 24, the application server 330 sets the today's date as the preparation start day in the plan item for the record of ID= 1 shown in FIG. 11. In step SF2, the application server 330 acquires the member-only calendar information (date and attribute) from the member-only calendar data base DB4.

In step SF3, the application server 330 determines whether the preparation start day set in step SF1 is a week day or not by reference to the date and attribute (see FIG. 5) of the member-only calendar information. In the case where the preparation start day is not a week day, the application server 330 determines the answer in step SF3 as "NO". In step SF5, the preparation start day (date) is incremented by one and then the process returns to step SF3.

In the case where the preparation start day is a week day, on the other hand, the application server 330 determines the answer in step SF3 as "YES". In step SF4, the application server 330 sets the preparation start day (date) of the plan item for the record of ID=1 shown in FIG. 11. In step SF6, the application server 330 sets the product of the total budget (see FIG. 17) input by the user A in step SA13 (see FIG. 13) and the cost ratio shown in FIG. 11 as a budget for the particular plan item.

In step SF7, the application server 330 stores the date and the budget as the "date" and the "budget", respectively, in the "item code"=010132 of the member plan data base DB3 shown in FIG. 4, and then proceeds to step SC8 shown in FIG. 21. In step SC8, the application server 330 determines whether the process for all the plan items (ID=1 to 125) in the plan item data base DB10 is complete or not. In this case, the process remains unfinished for the plan items of ID=2 to 125, and therefore the application server 330 determines the answer in step SC8 as "NO", and returns to step SC5.

In step SC5, the application server 330 accesses the plan item data base DB10, and after thus acquiring the plan item information for ID=2, proceeds to step SC6. After that, the same process as the one described above is executed, so that the process for the plan items of ID=2 to 125 is executed.

Assume, for example, that the plan item information for ID=3 shown in FIG. 11 is acquired in step SC5. In step SC6, the application server 330 determines the answer as "YES", since the (holiday) designation in the record of ID=3 in the plan item data base DB10 shown in FIG. 11 is "holiday".

Figure 22:
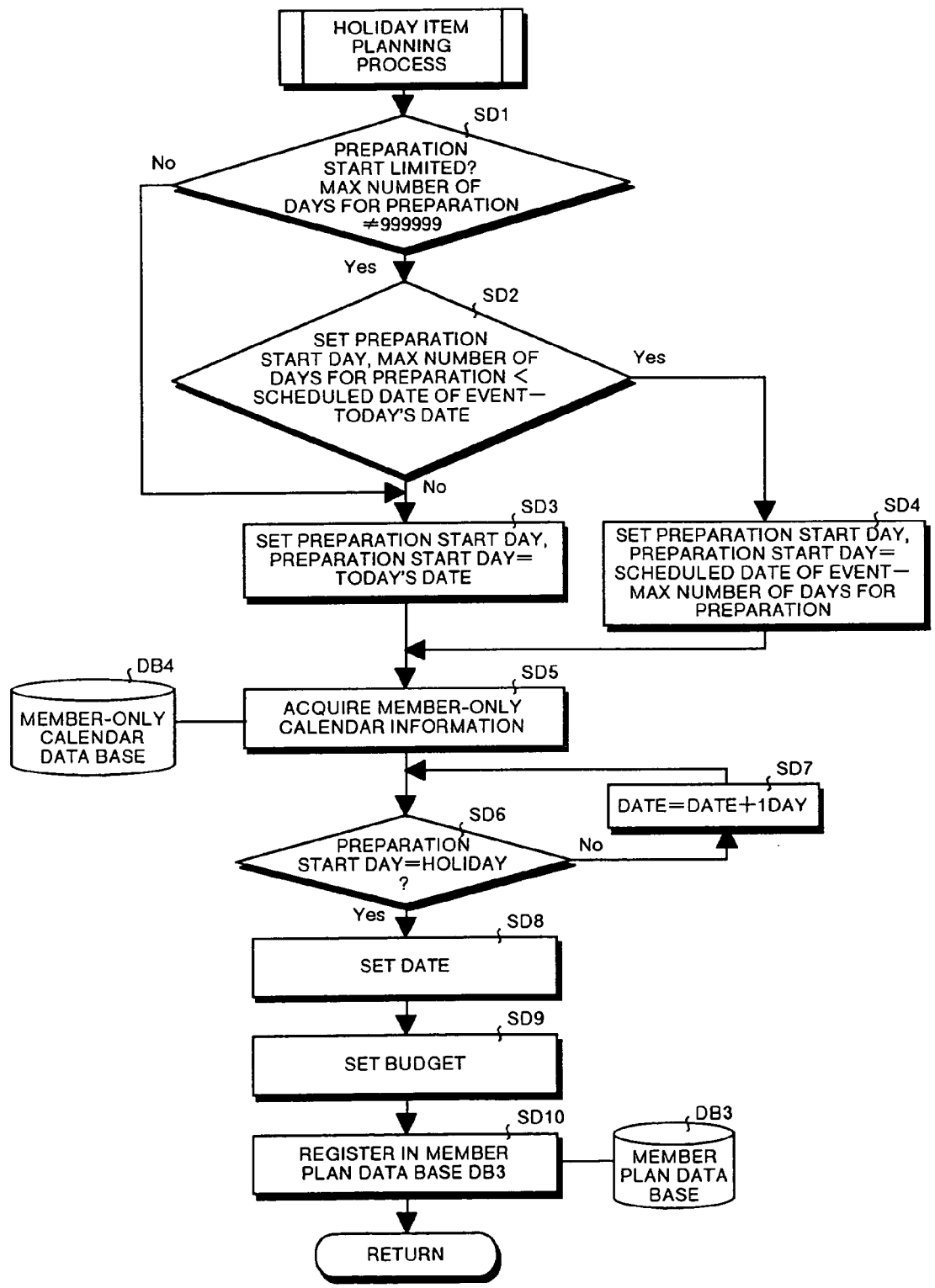
FIG. 22 is a detailed flowchart of the holiday item planning process shown in FIG. 21.

In step SC7, the application server 330 executes the holiday item planning process (see FIG. 22). Specifically, in step SD1 shown in FIG. 22, it is determined whether the preparation start is limited for the plan item of ID=3 (see FIG. 11). In the case where there is no limit to the preparation start, "999999" is set in the field of the maximum number of days for preparation shown in FIG. 11. In the case where there is a limit to the preparation period, on the other hand, a numerical value other than "999999" is set in the same field. In such a case, the maximum number of days for preparation in the record of ID=3 shown in FIG. 11 is set to "999999", and therefore the server application 330 determines the answer in step SD1 as "NO".

In step SD3, the application server 330 sets as the today's date the preparation start day of the plan item for the record of ID=3 shown in FIG. 11. In step SD5, the application server 330 acquires the member-only calendar information (date and attribute) from the member-only calendar data base DB4.

In step SD6, the application server 330 determines whether the preparation start day set in step SD3 is a holiday or not by reference to the date and the attribute in the member-only calendar information. In the case where the preparation start day is not a holiday, the application server 330 determines the answer in step SD6 as "NO". In step SD7, the preparation start day (date) is incremented by one, and the process in step SD6 is repeated.

In the case where the preparation start day is a holiday, on the other hand, the application server 330 determines the answer in step SD6 as "YES". In step SD8, the application server 330 sets the preparation start day (date) of the plan item for the record of ID=3 shown in FIG. 11. In step SD9, the application server 330 sets the product of the total budget (see FIG. 17) input by the user A in step SA13 (see FIG. 13) and the cost ratio shown in FIG. 11 as a budget for the particular plan item.

In step SD10, the application server 330 stores the date and the budget as the "date" and "budget", respectively, in the "item code"=010168 of the member plan data base DB3 shown in FIG. 4, and then proceeds to step SC8 shown in FIG. 21 for executing the process described above.

In the case where the determination in step SD1 shown in FIG. 22 is "YES", on the other hand, in step SD2, the application server 330 determines the setting of the preparation start day. Specifically, the application server 330 determines whether the number of days from today to the scheduled date of the event exceeds the maximum number of days for preparation or not. When the result of this determination is "NO", the application server 330 proceeds to step SD3. In step SD3, the application server 330 sets the today's date as the preparation start day and proceeds to step SD5 for executing the process described above.

In the case where the result of determination in step SD2 is "YES", on the other hand, the application server 330 proceeds to step SD4. In step SD4, the application server 330 sets the date traced back by the maximum number of days for preparation from the scheduled date of the event (wedding ceremony) as a preparation start day, and then proceeds to step SD5 for executing the process described above.

Also, once the plan item information for ID=123 shown in FIG. 11 is acquired in step SC5 shown in FIG. 21, the application server 330 determines the answer in step SC6 as "NO" and proceeds to step SC10 since the (holiday) designation in the record of ID=123 in the plan item data base DB10 shown in FIG. 11 is "nil".

In step SC10, the application server 330 determines whether there is a limit to the preparation period for the plan item of ID=123 (see FIG. 11). In this case, the maximum number of days for preparation is set to 120 in the record of ID=123 shown in FIG. 11, and therefore the application server 330 determines the answer in step SC10 as "YES".

Figure 23:
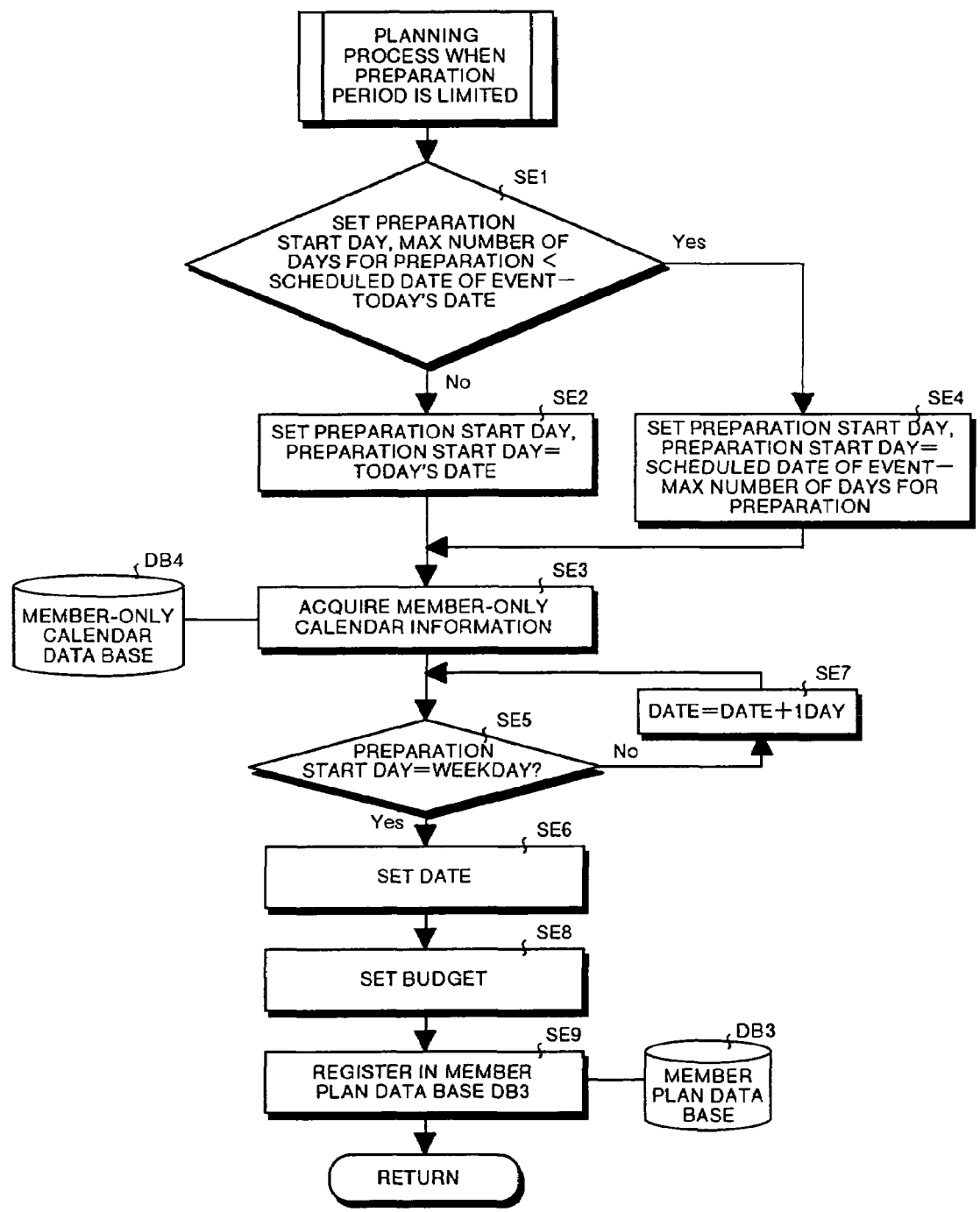
FIG. 23 is a detailed flowchart of the planning process when the preparation period is limited, shown in FIG. 21.

In step SC11, the application server 330 executes the planning process (see FIG. 23) when the preparation period is limited. Specifically, in step SE1 shown in FIG. 23, the application server 330 determines to set the preparation start day. Specifically, the application server 330 determines whether the number of days from today to the scheduled date (see FIG. 17) of the event exceeds the maximum number of days for preparation (see FIG. 11) or not, and in the case where this determination is "NO", proceeds to step SE2. In step SE2, the application server 330 sets the today's date as the preparation start day, and then proceeds to step SE3.

In the case where the determination in step SE1 is "YES", on the other hand, the application server 330 proceeds to step SE4. In step SE4, the application server 330 sets the date traced back by the maximum number of days for preparation from the scheduled date of the event (wedding ceremony) as a preparation start day, and then proceeds to step SE3.

In step SE3, the application server 330 acquires the member-only calendar information (date and attribute) from the member-only calendar data base DB4. In step SE5, the application server 330 determines whether the preparation start day set in step SE2 is a week day or not by reference to the date and attribute (see FIG. 5) of the member-only calendar information. In the case where the preparation start day is not a week day, the application server 330 determines the answer in step SE5 as "NO" and proceeds to step SE7. In step SE7, the application server 330 increments the preparation start day (date) by one and repeats the process in step SE5.

In the case where the preparation start day is a week day, on the other hand, the application server 330 determines the answer in step SE5 as "YES". In step SE6, the application server 330 sets the preparation start day (date) of the plan item for the record of ID=123 shown in FIG. 11. In step SE8, the application server 330 sets the product of the total budget (see FIG. 17) input by the user A in step SA13 (see FIG. 13) and the cost ratio shown in FIG. 11 as a budget for the particular plan item.

In step SE9, the application server 330 stores the date and the budget as the "date" and "budget", respectively, of the "item code"=010362 of the member plan data base DB3 shown in FIG. 4, and then proceeds to step SC8 shown in FIG. 21 for executing the process described above.

Figure 25:
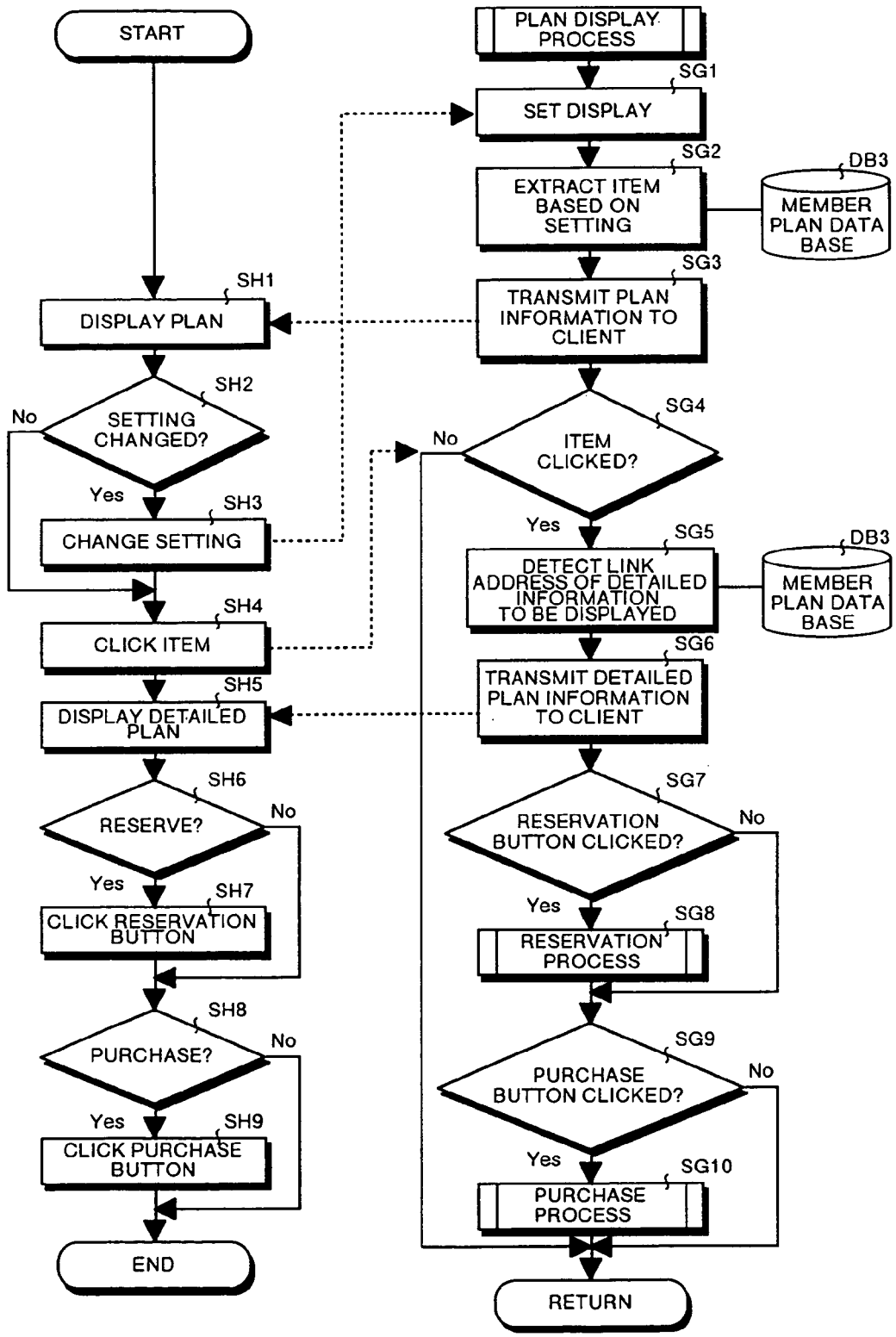
FIG. 25 is a detailed flowchart of the plan display process shown in FIG. 21.

Once the process is completed for all items and the determination in step SC8 turns "YES", the application server 330 proceeds to step SC9, and executes the plan display process (see FIG. 25) for displaying the plan formed exclusively for the user A on the display unit 120A. In FIG. 25, the process in steps SG1 to SG10 is executed by the application server 330, while the process in steps SH1 to SH9 is executed by the client 110A.

Figure 26:
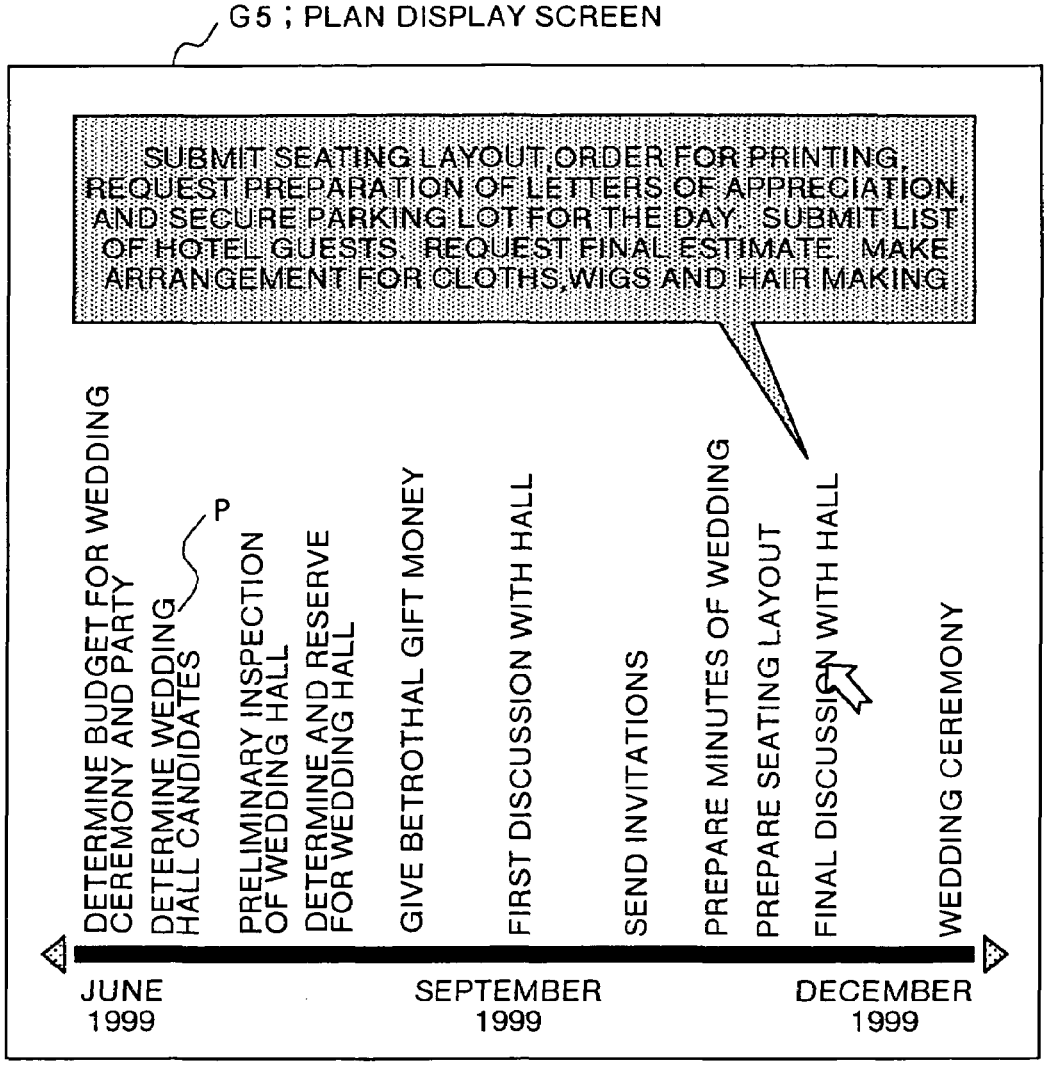
FIG. 26 is a diagram showing an example of the plan display screen G5.

In step SG1 shown in FIG. 25, the application server 330 sets a parameter for causing the client 110A to display the plan display screen G5 shown in FIG. 26, and proceeds to step SG2. This parameter is designated by the user A and represents the period and level of the plan (see FIG. 11). In step SG2, the application server 330 extracts the plan item (record) corresponding to the aforementioned setting from the member plan data base DB3.

In step SG3, the application server 330 transmits the information (plan information) of the plan item extracted in step SG2 to the client 110A through the Internet N. In step SG4, the application server 330 determines whether the plan item on the plan display screen G5 (see FIG. 26) described later has been clicked or not.

Once the plan information is received by the client 110A, on the other hand, in step SH1, the client 110A displays the plan display screen G5 shown in FIG. 26 on the display unit 120A based on the received plan information, and then proceeds to step SH2. The plan items exclusive to the user A (determination of budget for wedding ceremony and wedding party, and determination of candidates for the wedding hall) produced in the event plan production process (see step SA18) shown in FIG. 13 are displayed chronologically on the plan display screen G5.

In step SH2, the client 110A determines whether the setting is changed for the parameters described above (period and level of the plan), and in the case where the result of determination is "YES", proceeds to step SH3. In step SH3, the client 110A transmits the setting change to the application server 330 through the Internet N. In the case where no setting change is made in step SH2, on the other hand, the client 110A determines the answer as "NO".

In step SH4, the user A clicks using the mouse any one of the plant items on the plan display screen G5 shown in FIG. 26 for which a detailed plan is desired to be displayed. In this case, assume that the plan item P (determination of candidates for the wedding hall) shown in FIG. 26 is clicked. Then, the application server 330 determines the answer in step SG4 as "YES" and proceeds to step SG5.

In step SG5, the application server 330 accesses the member plan data base DB3 shown in FIG. 4, and thereby recognizes the record of ID=2 shown in FIG. 11 corresponding to the item code 010135. Then, the application server 330 detects the detailed information link address http://www.xxx.co.jp/life/ghi/jkl.html in the record of ID= 2 shown in FIG. 11.

In step SG6, the application server 330 transmits the detailed information link address to the client 110A through the Internet N as the detailed plan information. In step SG7, the application server 330 determines whether a not shown reservation button is clicked or not by the user A. This reservation button is for reserving the wedding hall, for example.

Upon receipt of the detailed plan information, the client 110A displays the detailed plan on the wedding hall in step SH5. In step SH6, the user A determines whether the wedding hall is to be reserved or not, and when the hall is not to be reserved, proceeds to step SH8. Assume that, the user A decides that the hall is to be reserved. In step SH7, the user A clicks the reservation button displayed on the display unit 120A.

Figure 28:
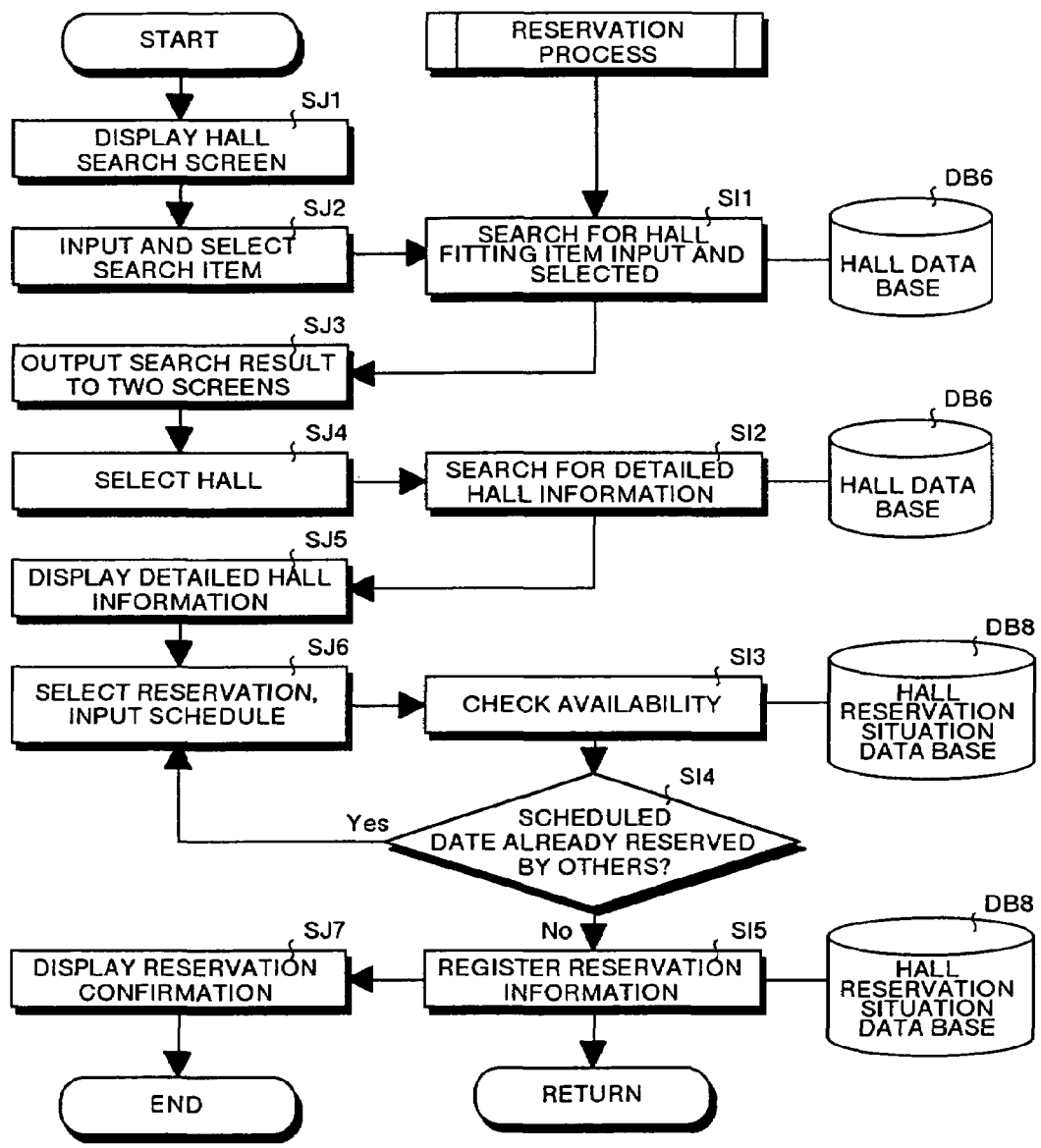
FIG. 28 is a detailed flowchart for explaining the reservation process shown in FIG. 25.

As a result, in step SG7, the application server 330 determines the answer as "YES", and proceeds to step SG8 for executing the reservation process (see FIG. 28) for the wedding hall. In FIG. 28, the process in steps SI1 to SI5 is executed by the application server 330, and the process in steps SJ1 to SJ7 is executed by the client 110A. In step SJ1, the client 110A displays the detailed display screen G6 shown in FIG. 27 on the display unit 120A and then proceeds to step SJ2.

A message to the user A, an image I and a search engine S are displayed on the detailed display screen G6. This search engine S is for searching for the home page of the wedding hall existing on the Internet N. In step SJ2, the user A inputs and selects the items (key word, etc.) for searching for the wedding hall, using the search engine S.

As a result, in step SI1, the application server 330 searches the wedding hall data base DB6 shown in FIG. 7 with the items input and selected in step SJ2 as a key. In the wedding hall data base DB6, a record configured with the fields of ID, hall name, zip code, address, telephone number, form indicating the type of the hall, Japanese style indicating the possibility (TRUE if possible, FALSE if not possible) of holding the wedding ceremony of Japanese style, Christian style indicating the possibility (TRUE if possible, FALSE if not possible) of holding the wedding ceremony in the church, . . . , minimum number of attendants indicating the minimum reserved number of attendants, maximum number of attendants indicating the maximum reserved number of attendants in the hall, facility and performance is stored for each ID.

Upon complete search, in step SJ3, the client 110A outputs the search result to the display unit 120A. As a result, the search result is displayed on the display unit 120A. In step SJ4, the user A selects the desired hall from the search result.

As a result, in step SI2, the application server 330 accesses the hall data base DB6, and searches the detailed information on the wedding halls selected by the user A. Upon complete search, in step SJ5, the client 110A displays on the display unit 120A the detailed information on the wedding halls, the select button for reservation and the input items for inputting the reservation schedule.

Then, in step SJ6, checking the display screen of the display unit 120A, the user A clicks the select button to enter a reserved day as an input item. As a result, in step SI3, the application server 330 confirms the hall availability information by referring to the hall reservation situation data base DB8 shown in FIG. 9. In the hall reservation situation data base DB8, a record configured with the fields of date, reservation indicating whether the hall is reserved or not, name of reserver, address of the hall, telephone number, etc. is stored for each date. This hall reservation situation database DB8 is updated as required based on the latest information from the detailed information server 210 shown in FIG. 1.

In the next step SI4, the application server 330 determines whether another reservation is entered for the date scheduled by the user A based on the result of availability check in step SI3, and in the case where the determination is "YES", notifies the client 110A of the prior reservation. In such a case, in step SJ6, the user A changes the reserved date.

In the case where the determination in step SI4 is "NO", on the other hand, the application server 330 proceeds to step SI5 for registering the reservation information. Specifically, the application server 330 enters "reserved" in the associated "reservation" column in the hall reservation situation data base DB8. Further, the application server 330 transmits the reservation information to the reservation server 220 shown in FIG. 1 through the Internet N, and proceeds to step SG9 shown in FIG. 25. As a result, the formal reservation for the hall is completed. Also, in step SJ7, the client 110A displays the reservation check screen on the display unit 120A.

Returning to FIG. 25, the application server 330 determines in step SG9 whether the purchase button is clicked by the user A or not. In step SH8, on the other hand, the user A determines whether the commodity (the hall service in this case) is purchased or not, and in the case where the determination is "NO", the whole series of the process is terminated. In such a case, the user A determines the answer in step SH8 as "YES", and proceeds to step SH9. In step SH9, the user A clicks the purchase button (not shown) displayed on the display unit 120A.

Figure 29:
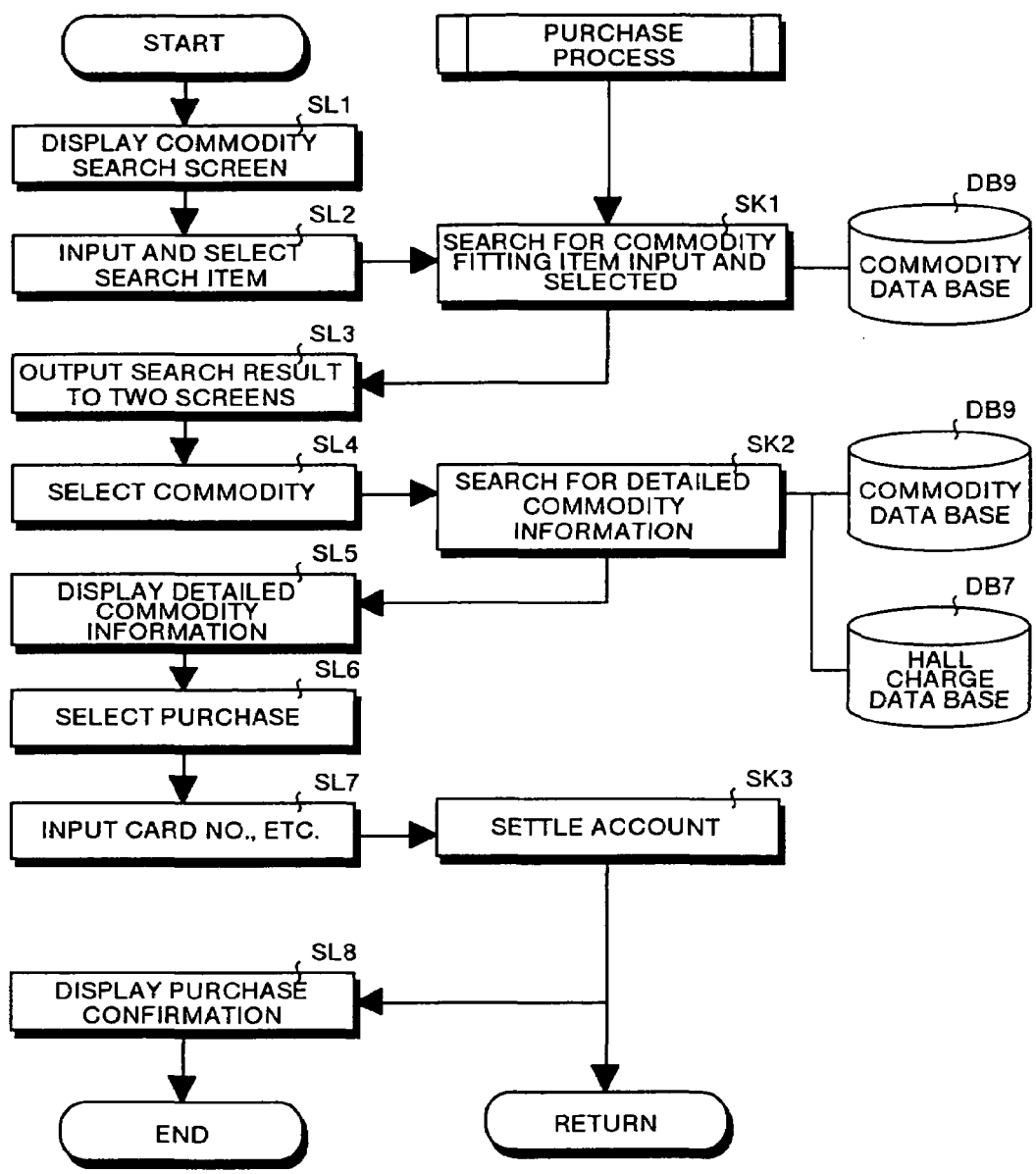
FIG. 29 is a detailed flowchart for explaining the purchase process shown in FIG. 25.

As a result, the application server 330 determines the answer in step SG9 as "YES", and proceeds to step SG10 for executing the purchase process (see FIG. 29). In FIG. 29, the process in steps SK1 to SK3 is executed by the application server 330, and the process in steps SL1 to SL8 is executed by the client 110A. In step SL1, the client 110A displays a commodity search screen for searching the commodities (the hall services, in this case) on the display unit 120A.

In step SL2, the user A inputs and selects the items (key word, etc.) for searching the halls using the search engine. As a result, in step SK1, the application server 330 searches the commodity data base DB9 shown in FIG. 10 with the items input and selected in step SL2 as a key. This commodity data base DB9 has stored therein a record configured with the fields of ID, commodity name, commodity number, link to magazine page and telephone number for each ID.

Upon completion of the search, in step SL3, the client 110A outputs the search result to the display unit 120A. As a result, the search result (see FIG. 10) is displayed on the display unit 120A. In step SL4, the user A selects the desired commodity from the search result.

As a result, in step SK2, the application server 330 searches the detailed information on the commodity selected by the user A, by accessing the commodity data base DB9 (see FIG. 10) and the hall charge data base DB7 (see FIG. 8). In the hall charge data base DB7 shown in FIG. 8, a record configured with the fields of item, minimum charge and maximum charge is stored for each item.

Upon completion of the search, in step SL5, the client 110A displays on the display unit 120A the detailed information (see FIG. 8) on the commodity, a commodity button for purchasing the commodity, and an input column for inputting the number of the credit card. Then, in step SL6, the user A clicks the purchase button while checking the display screen of the display unit 120A.

In step SL7, the user A inputs the number of the credit card for payment. As a result, in step SK3, the application server 330 transmits the credit card number information to the payment system 410 through a dedicated line L shown in FIG. 1, after which it completes the series of purchase process (the process for producing the event plan), and proceeds to step SA19 (see FIG. 13). As a result, the account is settled in the payment system 410 using the credit card held by the user A. Also, in step SL8, the client 110A displays the purchase check screen on the display unit 120A.

Returning to FIG. 13, the application server 330 determines in step SA19 whether the user A has instructed to terminate the automatic planning of the event or not, and in the case where the determination is "YES", terminates the series of the process. In the case where the determination in step SA19 is "NO", on the other hand, the application server 330 returns to step SA4 for executing the process described above.

In the case where the determination in step SA5 is "NO" or in the case where the determination in step SA11 is "YES", on the other hand, the application server 330 proceeds to step SA6. In step SA6, the application server 330 executes the process for causing the user A to select any one of the scheduler function, the fund/cost management function, the check list function and the simulation function.

Assuming that the user A clicks the scheduler function select soft button B1 shown in FIG. 16, the application server 330 proceeds to step SA7 for executing the scheduler process. In this scheduler process, the plan display screen G7 shown in FIG. 30a is displayed on the display unit 120A.

The plan display screen G7 is the result of chronological scheduling of the event plan produced in step SA18. The calendar of September 1999 and the events (speech, wedding ceremony and honeymoon) are illustrated on this screen. For example, speech is described in the column of September 22, wedding ceremony in the column of September 23, and honeymoon in the column of September 24.

When the user A clicks the portion of September 23, the detailed plan display screen G8 for the marriage shown in FIG. 30 is displayed on the display unit 120A. This detailed plan display screen G8 has displayed thereon "item" such as ceremony and eatables, "shop" such as the A hotel and the rental house, "amount" and "breakdown" or other detailed items of the plan for the marriage.

Assume that the user A clicks the check list function select soft button B2 shown in FIG. 16, on the other hand. The application server 330 proceeds to step SA9 and executes the check list process. In this check list process, a list of the preparatory acts to be carried out by the user A in executing the event (the wedding ceremony, for example) is produced, and then the check mark is attached on each of the acts that have been executed on the list.

Also, assume that the user A clicks the fund/cost management function select soft button B3 shown in FIG. 16. The application server 330 proceeds to step SA8, and executes the fund/cost management process. In this fund/cost management process, the fund, expenses, budget and receipts and disbursements for carrying out the event are managed.

Assume that the user A clicks the simulation function select soft button B4 shown in FIG. 16. In step SA10, the application server 330 executes the simulation process. In this simulation process, a series of acts from the preparation to execution of the planned event is displayed to the user A by animation or the like.

As described above, an automatic planning is carried out by taking into account the character of the user and required initial conditions input by the user. The character of the is determined from the answers the user has given with respect to a questionnaire. Therefore, the workload on the part of the user can be reduced, while at the same time making it possible to form a plan suitable for the user both easily and accurately.

Further, the plan data corresponding to the character pattern is held in the main plan data base DB2 in advance, and based on this plan data, the schedule is formed. Thus, a plan can be formed automatically with a very simple method.

Further, the detailed plan information (detailed display screen G6, see FIG. 27) is presented to the user, and therefore the user is not required to collect the detailed data by himself for an improved convenience.

Further, the requests for reservation, purchase and payment are received from the user, and therefore the planning, reservation, purchase and payment can be conveniently carried out at one place.

Further, the schedule for various events in the life cycle of the user (such as marriage, child bird, purchase of a house and funeral) can be formed, and therefore the life of the user can be totally supported, thereby providing a service of very high quality.

An embodiment of the present invention has been described above in detail with reference to the drawings. A specific configuration, however, is not confined to the embodiment, but can be redesigned or modified without departing from the scope and spirit of the present invention. In the embodiment described above, for example, the automatic planning program for realizing the automatic planning function can be recorded in the computer readable recording medium 500 shown in FIG. 31 and the automatic planning program recorded in the recording medium 500 is read by the computer 400 for execution.

Figure 31:
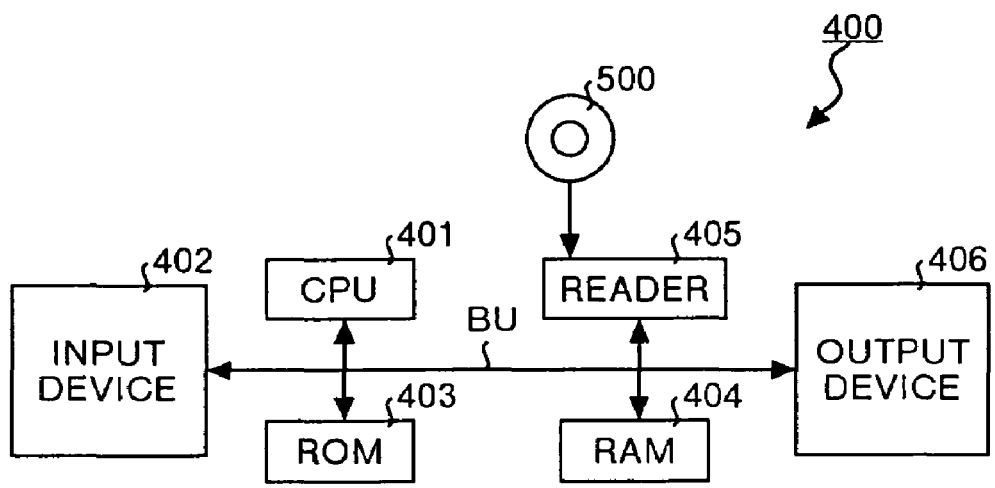
FIG. 31 is a block diagram showing a modification of the same embodiment.

The computer 400 shown in FIG. 31 includes a CPU 401 for executing the automatic planning program, an input device 402 such as a keyboard or a mouse, a ROM (read-only memory) 403 for storing various data, a RAM (random access memory) 404 for storing arithmetic parameters, a reader 405 for reading the automatic planning program from the recording medium 500, an output device 406 such as a display or a printer, and a bus BU for connecting the various parts of the apparatus.

The CPU 401 reads the automatic planning program recorded in the recording medium 500 through the reader 405 and executes the automatic planning program thereby to realize the automatic planning function described above. By the way, the recording medium 500 includes a network or the like transmission medium for temporarily holding the data as well as portable recording media such as an optical disk, a floppy disk and a hard disk.

Also, an embodiment was described above with reference to the case in which the planning is based on the result of the analysis of the character of the user. The present invention, however, is not limited to it, but the plan can be formed based on the result of propensity or character analysis from the viewpoint of the taste and the liking of the user. In short, the user can be analyzed from any viewpoint. In the case where the analysis is based on other than the character, the questionnaire from the particular viewpoint is of course carried out.

As an embodiment, the method of character analysis using a neural network was described. The present invention, however, is not limited to such a method but may employ other methods with equal effect.

Further, according to an embodiment, the date of execution of matters to be processed (such as the preliminary inspection of the wedding hall) for the items of the plan formed (plan display screen G5, FIG. 26) can be monitored by the application server 330, and notified to the client through the Internet N from the application server 330 immediately before the date of execution. Then, the user can positively process the matters.

As described above, according to the present invention, the planning is automatically performed simply by answering a questionnaire and following the procedure of inputting the required initial conditions, and therefore the workload of the user himself can be reduced while at the same time executing the planning easily and positively in a way suitable to the user.

Further, the plan data corresponding to the pattern of the user is stored in the storage unit in advance, and based on this plan data, the schedule is formed. Therefore, the planning can be accomplished automatically with a very simple method.

Further, the detailed data is supplied to the user, and therefore the user is not required to collect the detailed data by himself for an improved convenience.

Further, the items to be processed by the user are notified to the user in a schedule by the reporting unit. Therefore, the user can process the items positively, and the planning result is managed on the system side. Thus, the troubles (loss, fouling, etc.) which have thus far been caused by the paper-based management can be avoided.

Further, the reservation is received from the user by the reservation unit, and therefore the planning and the reservation can be accomplished at the same time for an improved convenience.

Further, the request for purchase of articles and services is received from the user by the purchase unit, and therefore the planning and purchase can be accomplished at the same place for an improved convenience.

Further, the account can be settled on-line by the payment unit, and therefore the planning, purchase and payment can be accomplished at one place for a further improved convenience.

Further, the schedule for various events (marriage, child birth, purchase of a house and funeral, for example) in the life cycle of the user can be formed by the planning unit. Thus, the life of the user can be totally supported and a very high quality of service can be provided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An automatic planning apparatus is connected through a network to at least one client operated by a user, said automatic planning apparatus comprising:
    a questionnaire unit which creates and provides a questionnaire to a user to determine a character of the user through said network;
    an analysis unit which receives answers to the questionnaire from the user and analyzes the character of the user based on a predetermined analysis method and the answers received;
    an input unit for inputting initial conditions required for planning an event selected by the user, the event including a plurality of event items;
    a planning unit which automatically plans a schedule for preparation and execution of the event including the event items as a whole based on the input initial conditions and the character of the user determined by said analysis unit; and
    a storage unit which stores a plurality of plan data for the event, each planning data corresponding to one of a plurality of patterns each being a classification of a character,
    wherein said planning unit recognizes a pattern corresponding to the user based on the character of the user determined by said analysis unit, reads the plan data corresponding to the pattern recognized from said storage unit, and plans the schedule based on the plan data read,
    further comprising a purchase unit for receiving a request from the user for purchase of any article or any service to be supplied available in the schedule.

2. The automatic planning apparatus according to claim 1, wherein said storage unit stores detailed data required by the user for the preparation and execution of the event, and said planning unit supplies said detailed data in addition to the plan data in response to a request from the user.

3. The automatic planning apparatus according to claim 1, further comprising a management unit which manages the schedule planned by said planning unit and notifies the user of the items to be processed by the user in the schedule.

4. The automatic planning apparatus according to claim 1, further comprising a receiving unit which receives the reservation from the user for an item to be reserved beforehand in the schedule.

5. The automatic planning apparatus according to claim 1, further comprising a payment unit for receiving an on-line payment of charge for the purchase of the article or service.

6. The automatic planning apparatus according to claim 1, wherein the event is one of various events in life, and said planning unit forms a schedule for the preparation and execution of the event for at least one of the various events in a life of the user.

7. The automatic planning apparatus according to claim 1, wherein the character is a character rating based on a character analysis of the user using answers to the questionnaire.

8. The automatic planning apparatus according to claim 7, wherein the analysis unit performs the character analysis by determining the character rating based on a level selected from a predetermined set of levels for at least one character factor of affection, sincerity, delicacy, action and courage.

9. A computer readable medium storing instructions, which when executed by a computer, cause the computer to perform:
    creating and providing a questionnaire to a user to determine a character of the user through the network;
    receiving answers to the questionnaire from the user;
    analyzing the character of the user based on a predetermined analysis method and answers to the questionnaire received from the user;
    inputting initial conditions required for planning an event selected by the user, the event including a plurality of event items;
    planning a schedule automatically for preparation and execution of the event as a whole including the event items based on the input initial conditions and the character of the user determined, and
    storing a plurality of plan data for the event, each planning data corresponding to one of a plurality of patterns each being a classification of a character,
    wherein a pattern corresponding to the user is recognized based on the character of the user determined, and the planning includes reading the plan data corresponding to the pattern recognized, and planning the schedule based on the plan data read,
    receiving a request from the user for purchase of any article or any service to be supplied available in the schedule.

10. An automatic planning apparatus with which a user can plan a desired event including a plurality of event items, said automatic planning apparatus comprising:

a display unit which displays various data;

a questionnaire unit which creates a questionnaire based on which a character of the user can be analyzed and makes said display unit display the questionnaire;

an input with which the user can input answers to the questionnaire and certain initial conditions required for planning execution of the desired event;

an analysis unit which receives the answers input by the user, and analyzes the character of the user based on the answers received and a predetermined analysis;

a planning unit which automatically creates a schedule for preparation and execution of the desired event including the event items as a whole based on the initial conditions input by the user and the character of the user analyzed; and a storage unit which stores a plurality of plan data for the event, each planning data corresponding to one of a plurality of patterns each being a classification of a character, wherein said planning unit recognizes a pattern corresponding to the user based on the character of the user determined by said analysis unit, reads the plan data corresponding to the pattern recognized from said storage unit, and plans the schedule based on the plan data read, further comprising a purchase unit for receiving a request from the user for purchase of any article or any service to be supplied available in the schedule.

11. The automatic planning apparatus according to claim 10, wherein at least said display unit and said input unit are provided with a client, and said client is connected with rest of the units through a network.

* * * * *